US010690759B2

(12) United States Patent
Hamada

(10) Patent No.: US 10,690,759 B2
(45) Date of Patent: Jun. 23, 2020

(54) INFORMATION PROCESSING DEVICE, INFORMATION PROCESSING METHOD, AND INFORMATION PROCESSING SYSTEM

(71) Applicant: FELICA NETWORKS, INC., Tokyo (JP)

(72) Inventor: Yu Hamada, Tokyo (JP)

(73) Assignee: FELICA NETWORKS, INC., Tokyo (JP)

(*) Notice: Subject to any disclaimer, the term of this patent is extended or adjusted under 35 U.S.C. 154(b) by 304 days.

(21) Appl. No.: 15/560,304

(22) PCT Filed: Feb. 24, 2016

(86) PCT No.: PCT/JP2016/055516
§ 371 (c)(1),
(2) Date: Sep. 21, 2017

(87) PCT Pub. No.: WO2016/158105
PCT Pub. Date: Oct. 6, 2016

(65) Prior Publication Data
US 2018/0059208 A1 Mar. 1, 2018

(30) Foreign Application Priority Data

Mar. 31, 2015 (JP) ................. 2015-072096

(51) Int. Cl.
*G01S 11/06* (2006.01)
*H04W 84/10* (2009.01)
(Continued)

(52) U.S. Cl.
CPC ............... *G01S 11/06* (2013.01); *H04B 1/59* (2013.01); *H04W 84/10* (2013.01); *G01S 5/14* (2013.01); *H04W 4/35* (2018.02)

(58) Field of Classification Search
CPC ....... G01S 5/0054; G01S 11/06; G01R 29/08; H04W 84/10
(Continued)

(56) References Cited

U.S. PATENT DOCUMENTS 5,768,333 A * 6/1998 Abdel-Mottaleb .... A61B 6/502
378/37
7,233,145 B2 * 6/2007 Mueller ............. G01R 33/5659
324/307
(Continued)

FOREIGN PATENT DOCUMENTS

JP 2002-261658 A 9/2002
JP 2004-242122 A 8/2004
(Continued)

OTHER PUBLICATIONS

International Search Report and Written Opinion of PCT Application No. PCT/JP2016/055516, dated May 17, 2016, 07 pages of ISRWO.

*Primary Examiner* — Dao L Phan
(74) *Attorney, Agent, or Firm* — Chip Law Group

(57) ABSTRACT

Provided is an information processing device including an acquisition unit that acquires a measurement result of a radio wave, an extraction unit that extracts a measurement result indicating an intensity included in a range from top 10% to top 30% from a plurality of measurement results acquired by the acquisition unit, and a processing unit that performs a predetermined process by using the measurement result extracted by the extraction unit.

11 Claims, 24 Drawing Sheets

(51) Int. Cl.
*H04B 1/59* (2006.01)
*H04W 4/35* (2018.01)
*G01S 5/14* (2006.01)

(58) Field of Classification Search
USPC .......................................................... 342/386
See application file for complete search history.

(56) References Cited

U.S. PATENT DOCUMENTS

| | | | |
|---|---|---|---|
| 2002/0047853 A1* | 4/2002 | Bartell | B82Y 15/00 |
| | | | 345/651 |
| 2004/0157621 A1 | 8/2004 | Yamasaki et al. | |
| 2008/0317305 A1* | 12/2008 | Cover | G06T 5/50 |
| | | | 382/128 |
| 2009/0160987 A1* | 6/2009 | Bechtel | H04N 5/353 |
| | | | 348/302 |
| 2011/0270079 A1* | 11/2011 | Osman | A61B 5/702 |
| | | | 600/421 |
| 2014/0203748 A1* | 7/2014 | Takada | H02P 29/62 |
| | | | 318/473 |
| 2015/0009856 A1* | 1/2015 | Shu | H04W 4/023 |
| | | | 370/252 |
| 2017/0311922 A1* | 11/2017 | Shan | A61N 1/40 |

FOREIGN PATENT DOCUMENTS

| | | |
|---|---|---|
| JP | 2009-049468 A | 3/2009 |
| WO | 2013/145324 A1 | 10/2013 |

\* cited by examiner

INFORMATION PROCESSING DEVICE,
INFORMATION PROCESSING METHOD,
AND INFORMATION PROCESSING SYSTEM

CROSS REFERENCE TO RELATED APPLICATIONS

This application is a U.S. National Phase of International Patent Application No. PCT/JP2016/055516 filed on Feb. 24, 2016, which claims priority benefit of Japanese Patent Application No. JP 2015-072096 filed in the Japan Patent Office on Mar. 31, 2015. Each of the above-referenced applications is hereby incorporated herein by reference in its entirety.

TECHNICAL FIELD

The present disclosure relates to information processing devices, information processing methods, programs, and information processing systems.

BACKGROUND ART

In recent years, technologies for performing processes such as position information estimation on the basis of an intensity of a radio wave have been developed. For example, Patent Literature 1 listed below discloses a technology for estimating a position of a terminal that has received a radio signal or a distance from the terminal on the basis of an intensity level of the radio wave received from a terminal whose existence position is known.

CITATION LIST

Patent Literature

Patent Literature 1: JP 2009-49468A

DISCLOSURE OF INVENTION

Technical Problem

However, the received radio wave includes many noises. Accordingly, unfortunately, a measured radio wave intensity varies in short time due to the noises even in the case where a distance between a terminal that has transmitted the radio wave and a terminal that has received the radio wave is constant. Therefore, in the case of using the above described technology, there is a possibility that the process is carried out erroneously as a consequence of the noises.

The present disclosure proposes a novel and improved information processing device, information processing method, program, and information processing system that are capable of appropriately performing processes based on radio wave intensities.

Solution to Problem

According to the present disclosure, there is provided an information processing device including: an acquisition unit configured to acquire a measurement result of a radio wave; an extraction unit configured to extract a measurement result indicating an intensity included in a range from top 10% to top 30% from a plurality of measurement results acquired by the acquisition unit; and a processing unit configured to perform a predetermined process by using the measurement result extracted by the extraction unit.

In addition, according to the present disclosure, there is provided an information processing method that is executed by an information processing device, the information processing method including: acquiring a measurement result of a radio wave; extracting a measurement result indicating an intensity included in a range from top 10% to top 30% from a plurality of acquired measurement results; and performing a predetermined process by using the extracted measurement result.

In addition, according to the present disclosure, there is provided a program causing a computer to function as: an acquisition unit configured to acquire a measurement result of a radio wave; an extraction unit configured to extract a measurement result indicating an intensity included in a range from top 10% to top 30% from a plurality of measurement results acquired by the acquisition unit; and a processing unit configured to perform a predetermined process by using the measurement result extracted by the extraction unit.

In addition, according to the present disclosure, there is provided an information processing system including: an acquisition unit configured to acquire a measurement result of a radio wave; an extraction unit configured to extract a measurement result indicating an intensity included in a range from top 10% to top 30% from a plurality of measurement results acquired by the acquisition unit; and a processing unit configured to perform a predetermined process by using the measurement result extracted by the extraction unit.

Advantageous Effects of Invention

As described above, according to the present disclosure, it is possible to appropriately perform processes based on radio wave intensities.

Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 5 is an example of a table that stores values of RSSIs of a plurality of acquired radio waves that have been sorted by time.

FIG. 7 is an example of a table that stores values of RSSIs of a plurality of acquired radio waves that have been sorted by time.

MODE(S) FOR CARRYING OUT THE INVENTION

Figure 1:
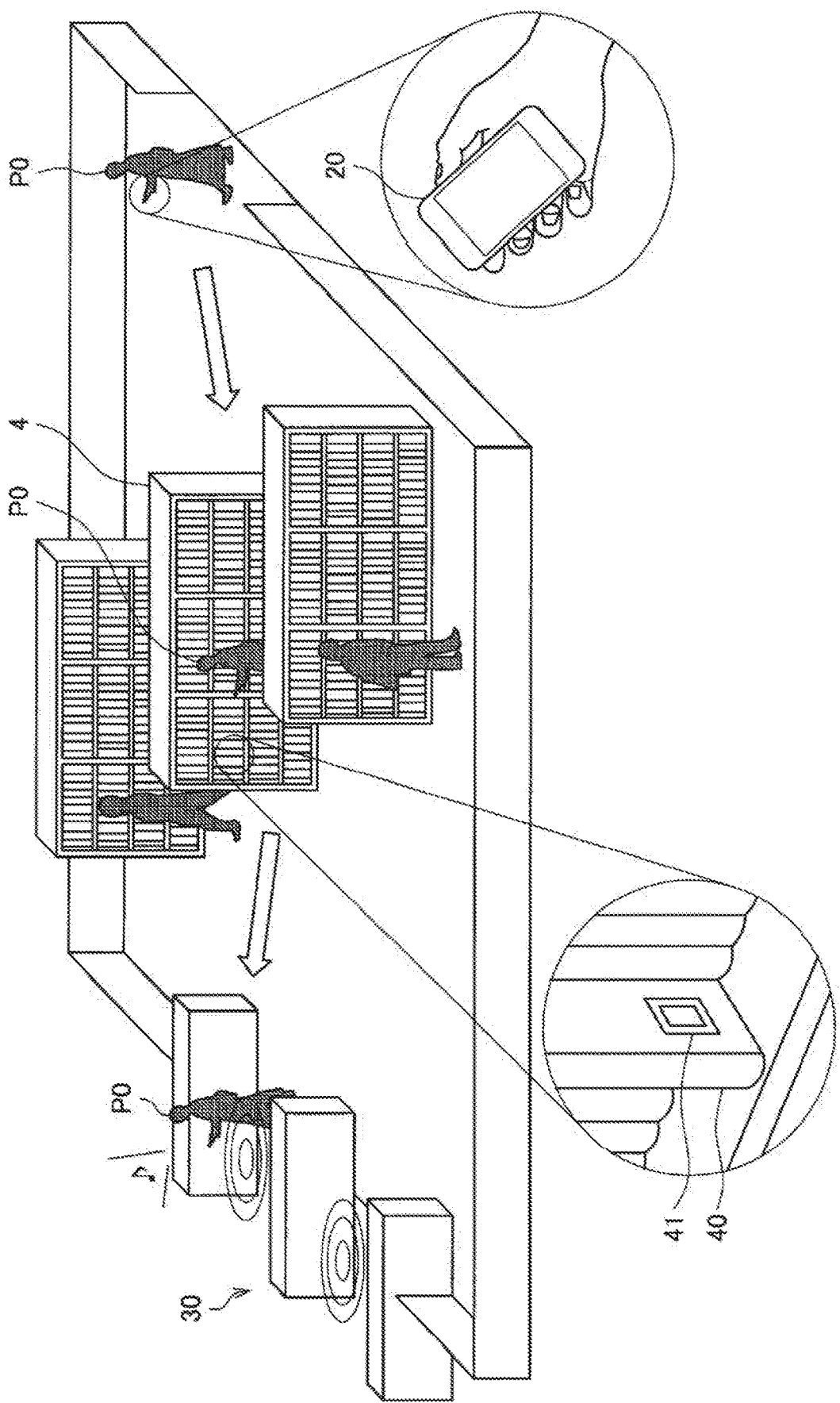
FIG. 1 is a diagram illustrating an overview of a configuration of an information processing system according to an embodiment of the present disclosure.

Hereinafter, (a) preferred embodiment(s) of the present disclosure will be described in detail with reference to the appended drawings. In this specification and the appended drawings, structural elements that have substantially the same function and structure are denoted with the same reference numerals, and repeated explanation of these structural elements is omitted.

Note that, in this description and the drawings, structural elements that have substantially the same function and structure are sometimes distinguished from each other using different alphabets after the same reference sign. However, when there is no need in particular to distinguish structural elements that have substantially the same function and structure, the same reference sign alone is attached.

Note that, the description is given in the following order.
1. Overview and configuration of information processing system according to embodiment
2. Configuration and operation of information processing device according to embodiment
2.1. Configuration
2.2. RSSI extraction range
2.3. Operation
2.4. Supplement
3. Operation of information processing system according to embodiment
3.1. First operation example
3.2. Second operation example
3.3. Third operation example
3.3.1. Configuration and operation related to first authentication process
3.3.2. Configuration and operation related to second authentication process
3.3.3. Supplement
3.4. Fourth operation example
4. Modification of information processing system according to embodiment
4.1. Configuration of information processing system
4.2. Operation example of information processing system
5. Hardware configuration diagram
6. Conclusion 1. Overview and Configuration of Information Processing System According to Embodiment Hereinafter, with reference to FIG. 1 and FIG. 2, an overview of an information processing system 1 according to an embodiment of the present disclosure will be described. FIG. 1 is a diagram illustrating an overview of a configuration of the information processing system 1 according to the embodiment of the present disclosure. Note that, as illustrated in FIG. 1, it is possible to apply the information processing system 1 according to the embodiment to a system for paying for a book in a book store, for example. However, the present technology is not limited thereto. For example, it is possible to apply the information processing system 1 to other fields such as payment in a retail store including a shopping mall, a convenience store, and the like, or a renting/lending process in a rental shop or a library. Next, an example of the information processing system 1 according to the embodiment that is applied to a payment system in a book store will be described.

(Overview)

As illustrated in FIG. 1, a person P0 with a communication terminal 20 in her hand enters a book store. For example, the communication terminal 20 may be a mobile terminal such as a mobile phone, a smartphone, or a tablet, or a wearable terminal such as a smartwatch or smartglasses. Functions and the like of the communication terminal 20 will be described later.

First, the person P0 goes to a book shelf 4 to get a book 40 that she wants to buy. An item tag 41 is attached to the book 40. The item tag 41 includes information on the book 40, and exchanges the information through communication with another device such as the communication terminal 20. For example, the information may be an item ID for identifying the book 40, position information of the book 40, or information on an arrival date, price, content of the book 40, or the like.

Note that, the item tag 41 is a tag capable of wireless communication such as a radio-frequency identification (RFID) tag or a Bluetooth (registered trademark) tag. Such a tag may be a passive tag or an active tag. The passive tag operates by using a radio wave transmitted from the communication terminal 20, a gate beacon 31, or the like as an energy source, and the active tag operates by using its own electric power from a built-in battery.

Subsequently, the person P0 with the book 40 in her hand goes to a gate 30 to buy the book 40. The gate 30 includes the gate beacon 31. The gate beacon 31 communicates with the communication terminal 20 and the item tag 41 for example, and performs a process on the basis of contents received through the communication. Subsequently, when the person P0 goes through the gate 30, communication is established between the communication terminal 20, the gate beacon 31, the item tag 41, and an information processing device 10 according to the present disclosure, and a process for paying for the book 40 to which the item tag 41 is attached is performed.

Accordingly, the user of the communication terminal 20 can complete the payment process and leave the store simply by going through an interval between the gates 30A and 30B with the communication terminal 20 in her hand, without paying for the book 40 at a cash register or the like.

Note that, examples of the communication established by the information processing system 1 according to the embodiment include wireless communication using IEEE802.15.1 such as Bluetooth Low Energy (BLE), a wireless local area network (LAN) using IEEE802.11, and the like.

(Configuration)

Figure 2:
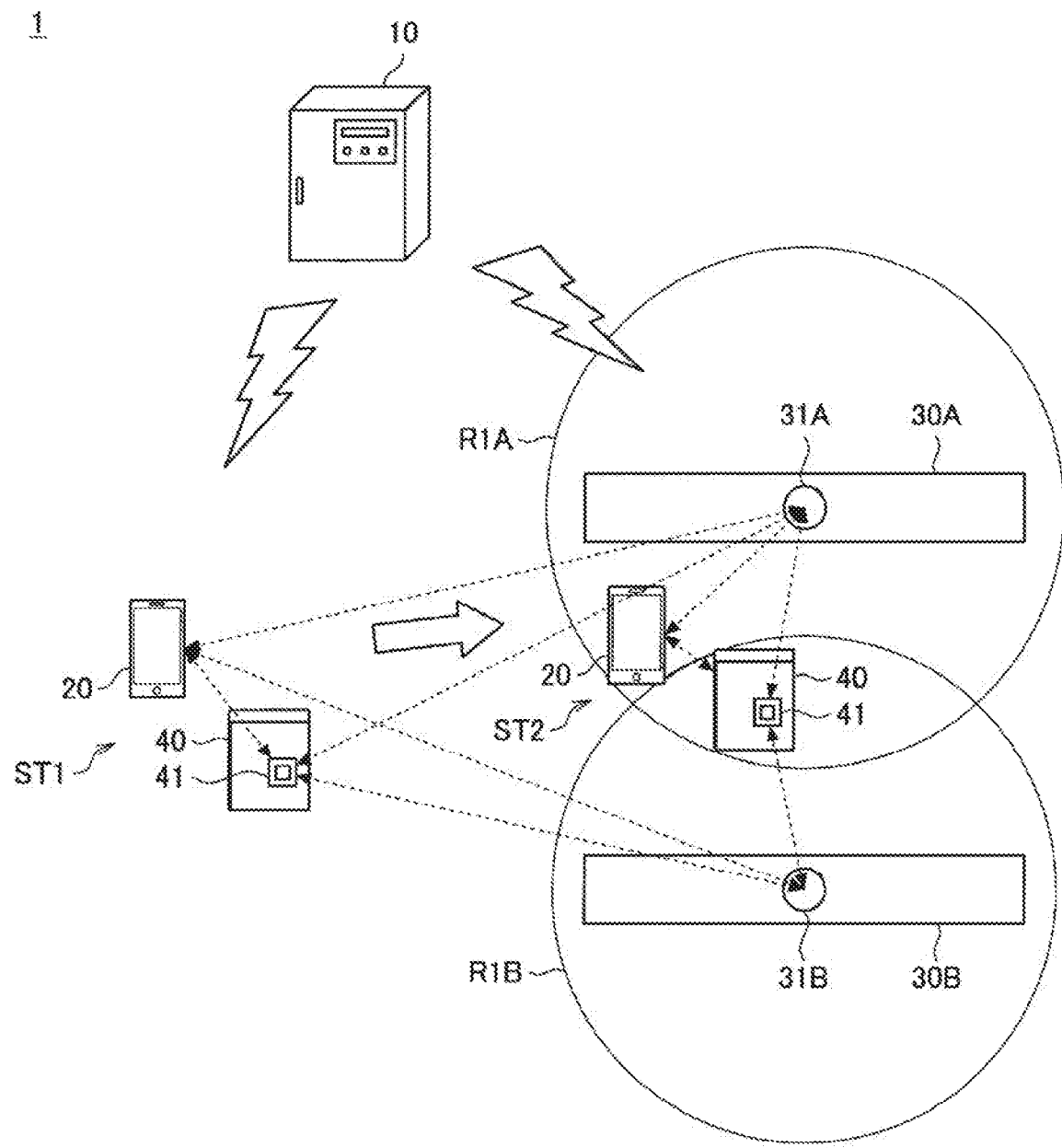
FIG. 2 is a diagram illustrating a configuration of an information processing system according to an embodiment of the present disclosure.

FIG. 2 is a diagram illustrating a configuration of the information processing system 1 according to the embodiment of the present disclosure. As illustrated in FIG. 2, the information processing system 1 includes the information processing device 10, the communication terminal 20, and the gates 30A and 30B. In addition, the gate 30A includes a gate beacon 31A, and the gate 30B includes a gate beacon 31B.

—Communication Terminal

For example, the communication terminal 20 may be a mobile terminal such as a mobile phone, a smartphone, or a tablet, or a wearable terminal such as a smartwatch or smartglasses. The communication terminal 20 may include: a communication unit configured to establish communication with the information processing device 10 or the like; a control unit configured to control the communication terminal 20; an input unit by which the user inputs information to the communication terminal 20; an output unit configured to output information to the user; and the like. For example, the function of the input unit may be achieved by a touchscreen, a button, or the like. For example, the function of the output unit may be achieved by a cathode ray tube (CRT) display device, a liquid crystal display (LCD) device, an organic light emitting diode (OLED) device, or the like. In addition, the functions of the input unit and the output unit may be achieved by a sound input/output device such as a microphone, a speaker, or the like.

The communication terminal 20 communicates with the information processing device 10, the gate beacon 31, and the item tag 41, and performs a process on the basis of information obtained through the communication. For example, the communication terminal 20 may transmit, to the information processing device 10, information acquired from the gate beacon 31 and the item tag 41, and RSSIs of radio waves in communication. The RSSIs may be measured by the communication terminal 20 during communication with the gate beacons 31 and the item tag 41.

In addition, the communication terminal 20 may include a security chip configured to manage a money balance of digital currency that is used for paying for an item. In addition, the communication terminal 20 may update the money balance recorded on the security chip when paying for the book 40 by using the information processing device 10. Note that, in this embodiment, description will be provided on the assumption that the communication terminal 20 includes the security chip.

In addition, the communication terminal 20 may authenticate the book 40 on the basis of an RSSI in communication with the item tag 41 attached to the book 40. Here, the authentication of the book 40 means associating the communication terminal 20 with the book 40, for example. Specifically, the authentication means a state in which the book 40 is in a cart of a shopping application installed in the communication terminal 20. Accordingly, it is possible for the information processing device 10 to perform a process for paying for the book 40 with regard to the communication terminal 20 that has authenticated the book 40. Note that, details of the authentication of the book 40 will be described in "3.3.1. Configuration and operation related to first authentication process" and "3.3.2. Configuration and operation related to second authentication process".

—Gate and Gate Beacon

The gate 30 may be placed near an exit, a cash register, or the like of a store using the information processing system 1. For example, the gate 30 may be a flapper gate or a door-type gate. The flapper gate includes a flap configured to prevent people from going through but open in the case where it is determined that a person is allowed to go through. The door-type gate includes a door. For example, when the information processing device 10 completes a process related to the book 40, the flap or door provided between the gates 30A and 30B opens.

The gate 30 includes the gate beacon 31. The gate beacon 31 may include: a communication unit configured to communicate with the information processing device 10 or the like; a control unit configured to control the gate 30 and the gate beacon 31; an output unit configured to output information to a user going through the gates 30; and the like. The gate beacon 31 communicates with the information processing device 10, the communication terminal 20, and the item tag 41, and performs a process on the basis of information obtained through the communication. For example, the gate beacon 31 may transmit, to the information processing device 10, information acquired from the communication terminal 20 and the item tag 41, and RSSIs of radio waves in communication. The RSSIs may be measured by the gate beacon 31 during communication with the communication terminal 20 and the item tag 41.

Note that, in the example illustrated in FIG. 2, the information processing device 10 performs a predetermined process on the basis of an RSSI of a radio wave in communication between the gate beacon 31A and the communication terminal 20. However, the present technology is not limited thereto. For example, the information processing device 10 may perform a predetermined process on the basis of two RSSIs (an RSSI of a radio wave in communication between the gate beacon 31A and the communication terminal 20, and an RSSI of a radio wave in communication between the gate beacon 31B and the communication terminal 20). Therefore, for example, it is possible to perform the payment process when the communication terminal 20 goes through an interval between the gates 30A and 30B not when the communication terminal 20 approaches the gate 30A or 30B.

In addition, the gate 30 may be a gate without the part that prevents people from going through. In addition, the gate 30 does not have to include a real housing. It is possible to simply place the gate beacon 31 (to be described later) near the exit or the cash register in the store. In addition, as illustrated in FIG. 1 and FIG. 2, it is possible to place a plurality of the gates 30.

—Book and Item Tag

The book 40 is an example of items sold in the store using the information processing device 10. For example, the above-described item is not limited to a book, a magazine, a newspaper sold in a book store. The item is not specifically limited as long as the item is any of goods displayed in a store such as a grocery, a food, a general merchandise, a piece of clothing, a piece of furniture, an electric appliance, a discretionary item, an entertainment item, or the like sold in a retail store such as a shopping mall, a convenience store, or the like. In addition, the item is not limited to merchandise for sale. For example, the item may be a book, a video, a digital versatile disc (DVD) soft, or the like for rent/lend in a rental shop, a library, or the like.

In addition, the item tag 41 is attached to the book 40 displayed in the store. The item tag 41 includes information on the book 40, and communicates the information with another device such as the communication terminal 20 or the like. For example, the information may include an item ID for identifying the book 40, position information of the book 40, or information on an arrival date, price, content of the book 40, or the like.

The item tag 41 communicates with the communication terminal 20 and the gate beacon 31, and transmits information included in the item tag 41. For example, the item tag 41 transmits information on the book 40 such as an item ID to the communication terminal 20 or the gate beacon 31 in the case where the item tag 41 approaches the communication terminal 20 or the gate beacon 31.

In addition, in the case where the communication terminal 20 authenticates the book 40, the item tag 41 may communicate with the near communication terminal 20, and transmit information on the book 40 such as the item ID.

In addition, the information processing device 10 may disable the item tag 41 after the book 40 to which paying for the item tag 41 is attached by using the information processing device 10. For example, the information processing device 10 may write a command to disable the tag on the item tag 41 via the communication terminal 20 or the gate beacon 31.

Note that, the item tag 41 is attached to the book 40 to perform the process for paying for the book 40 according to the embodiment. However, the present technology is not limited thereto. For example, the item tag 41 may be attached to the book 40 or the like to manage a stock of books displayed in book shelves. Specifically, the item tag 41 may be used for determining whether the book 40 to which the item tag 41 is attached is in a book shelf through communication with a beacon (not illustrated) attached to the book shelf, a ceiling, a wall, or the like in a store.

—Information Processing Device

The information processing device 10 performs a predetermined process on the basis of information on the communication terminal 20, any of the gate beacons 31A and 31B, and the item tag 41. Specifically, the information processing device 10 acquires information for identifying the communication terminal 20, the gate beacons 31A and 31B, and the item tag 41. In addition, the information processing device 10 acquires information on an intensity of a radio wave in communication measured by the communication terminal 20.

Note that, the intensity of the radio wave in the communication performed in the embodiment may be the received signal strength indication (RSSI), for example. In this embodiment, the description will be provided while the RSSI is used as an example of an intensity of a radio wave.

Subsequently, the information processing device 10 may determine a communication distance between the communication terminal 20 and the gate beacon 31, and a communication distance between the communication terminal 20 and the item tag 41, on the basis of the above described information, for example. In addition, on the basis of a result of the determination, the information processing device 10 may perform a process related to the book 40 to which the item tag 41 is attached. For example, the result of the determination may show whether the communication distance between the communication terminal 20 and the gate beacon 31 is a first distance or less and the communication distance between the communication terminal 20 and the item tag 41 is a second distance or less.

For example, in the case where the communication distance between the communication terminal 20 and the gate beacon 31A or 31B is the first distance or less, the user of the communication terminal 20 is considered to be in a position near the gate 30. In addition, in the case where the communication distance between the communication terminal 20 and the item tag 41 is the second distance or less, the user of the communication terminal 20 is considered to held the book 40 to which the item tag 41 is attached. Therefore, the information processing device 10 may perform a process related to the book 40 in the case where the communication distance between the communication terminal 20 and the item tag 41 and the communication distance between the communication terminal 20 and the gate beacon 31A or 31B are predetermined distances or less.

More specifically, as illustrated in FIG. 2, the information processing device 10 may perform the process related to the book 40 to which the item tag 41 is attached, in the case where it is determined that the communication terminal 20 is close to the book 40 and the communication terminal 20 is included in a predetermined range R1A of the gate beacon 31A or a predetermined range R1B of the gate beacon 31B.

Note that, for example, the process related to the book 40 may be a payment process for buying the book 40. For example, the information processing device 10 may handle the payment for the book 40, and send a request to pay for the book 40 to the communication terminal 20.

Note that, a detailed configuration of the information processing device 10 will be described in "2. Configuration of information processing device according to embodiment".

(Background)

To operate the information processing system 1 properly, it is necessary to determine accurate communication distances. For example, it is necessary for the information processing device to accurately determine that a communication distance between the communication terminal 20 and the gate beacon 31A and a communication distance between the item tag 41 and the gate beacon 31A are in predetermined ranges. Here, RSSIs of radio waves are used for determining the respective communication distances. In other words, the communication distance is estimated in accordance with an intensity of a measured RSSI.

However, the received radio wave includes many noises. Therefore, unfortunately, a measured RSSI varies in short time due to the noises even in the case where a distance between a terminal that has transmitted the radio wave and a terminal that has received the radio wave is constant. Therefore, in the case of determining a distance or the like in accordance with the measured RSSI, there is a possibility that the information processing device makes erroneous determination as a consequence of the noises.

Therefore, in view of such circumstances, the present disclosure proposes the information processing device 10 capable of extracting an RSSI with small variation from acquired RSSIs, and performing a predetermined process by using the extracted RSSI. By using the information processing device 10 according to the present disclosure, it is possible to certainly perform the process based on the RSSI. Next, detailed configuration and operation of the information processing device 10 according to the embodiment will be described.

2. Configuration and Operation of Information Processing Device According to Embodiment <2.1. Configuration>

Figure 3:
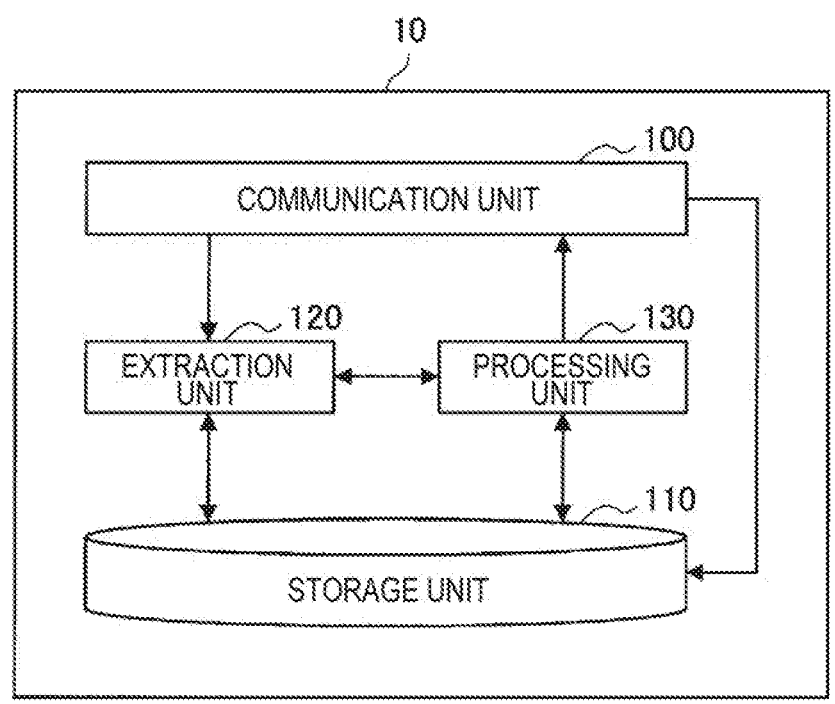
FIG. 3 is a block diagram illustrating a configuration of an information processing device according to an embodiment of the present disclosure.

Hereinafter, the configuration of the information processing device 10 according to the embodiment will be described. FIG. 3 is a block diagram illustrating the configuration of the information processing device 10 according to the embodiment of the present disclosure. As illustrated in FIG. 3, the information processing device 10 according to the embodiment includes a communication unit 100, a storage unit 110, an extraction unit 120, and a processing unit 130.

(Communication Unit)

The communication unit 100 is an interface configured to exchange information with the communication terminal 20 or the gate beacon 31. For example, the communication unit 100 establishes wireless communication with the communication terminal 20 and the gate beacon 31, and acquires measurement results including RSSIs of radio waves measured by the communication terminal 20 and the gate beacon 31. For example, the communication unit 100 may acquire measurement results of radio waves used for communication between the communication terminal 20 and the gate beacon 31, the item tag 41, or the like. Note that, the communication unit 100 may communicate with the gate beacon 31 in a wired manner.

The measurement results of the radio waves acquired by the communication unit 100 are output to the extraction unit 120. In addition, the measurement results may be stored in the storage unit 110. In addition, the communication unit 100 may transmit a process result obtained from the processing unit 130 to the communication terminal 20, the gate beacon 31, and the like. Note that, the communication unit 100 is an example of the acquisition unit.

(Storage Unit)

The storage unit 110 stores information obtained from the communication unit 100, the extraction unit 120, and the processing unit 130. For example, the storage unit 110 may store the measurement results of the radio waves acquired by the communication unit 100 in chronological order. In addition, the storage unit 110 may store measurement data that is sorted by the extraction unit 120. In addition, the storage unit 110 may store contents processed by the processing unit 130. In addition, the storage unit 110 may outputs the stored measurement data to the extraction unit 120.

(Extraction Unit)

The extraction unit 120 extracts a measurement result indicating an RSSI within a predetermined range from the measurement results output from the communication unit 100 or the storage unit 110. The RSSI within the predetermined range may be RSSIs included in a range from top 10% to top 30%, for example. Specifically, the extraction unit 120 sorts the RSSIs acquired within a predetermined time period in order from highest to lowest, and extracts RSSIs included in the range from top 10% to top 30% from the sorted RSSIs. Note that, the extraction unit 120 may extract RSSIs of top 10% or RSSIs of top 30%. As described later, the RSSIs included in the range are RSSIs with small variation due to noises. By using the RSSIs with small variation due to noises, it is possible for the processing unit 130 (to be described later) to perform an accurate process. Note that, details of basis of the extraction range will be described in "2.2. RSSI extraction range".

The extraction unit 120 outputs the extracted measurement result to the processing unit 130. In addition, the storage unit 110 may store measurement results that are sorted by the extraction unit 120.

(Processing Unit)

The processing unit 130 performs a predetermined process by using information on the measurement result output from the extraction unit 120 and the storage unit 110. For example, the processing unit 130 may perform the predetermined process by using the measurement result extracted by the extraction unit 120. Alternatively, the processing unit 130 may perform the predetermined process by using one or a plurality of measurement results stored in the storage unit 110 after the extraction performed by the extraction unit 120.

The predetermined process may be a process for determining a communication distance between a communication device and a measurement position of a radio wave transmitted from the communication device. More specifically, the processing unit 130 may perform a process for determining the communication distance between the communication device and the measurement position on the basis of the measurement result output to the processing unit 130. In general, the RSSI is considered to decrease as the communication distance increases. Therefore, it is possible for the processing unit 130 to determine the communication distance on the basis of the RSSI indicated by the measurement result output to the processing unit 130.

In addition, for example, the processing unit 130 may perform a process related to the book 40 after the above described determination process. For example, the process may be a process for paying for the book 40 or a process for authenticating the book 40.

The configuration of the information processing device 10 according to the embodiment has been described above. Note that, for example, the communication terminal 20 and the gate beacon 31 may include the above-described structural elements in the information processing device 10. For example, each of the control units in the communication terminal 20 and the gate beacon 31 may have functions of the extraction unit 120 and the processing unit 130.

Next, the basis for setting the RSSI extraction range of the extraction unit 120 will be described.

<2.2. RSSI Extraction Range>

Figure 4:
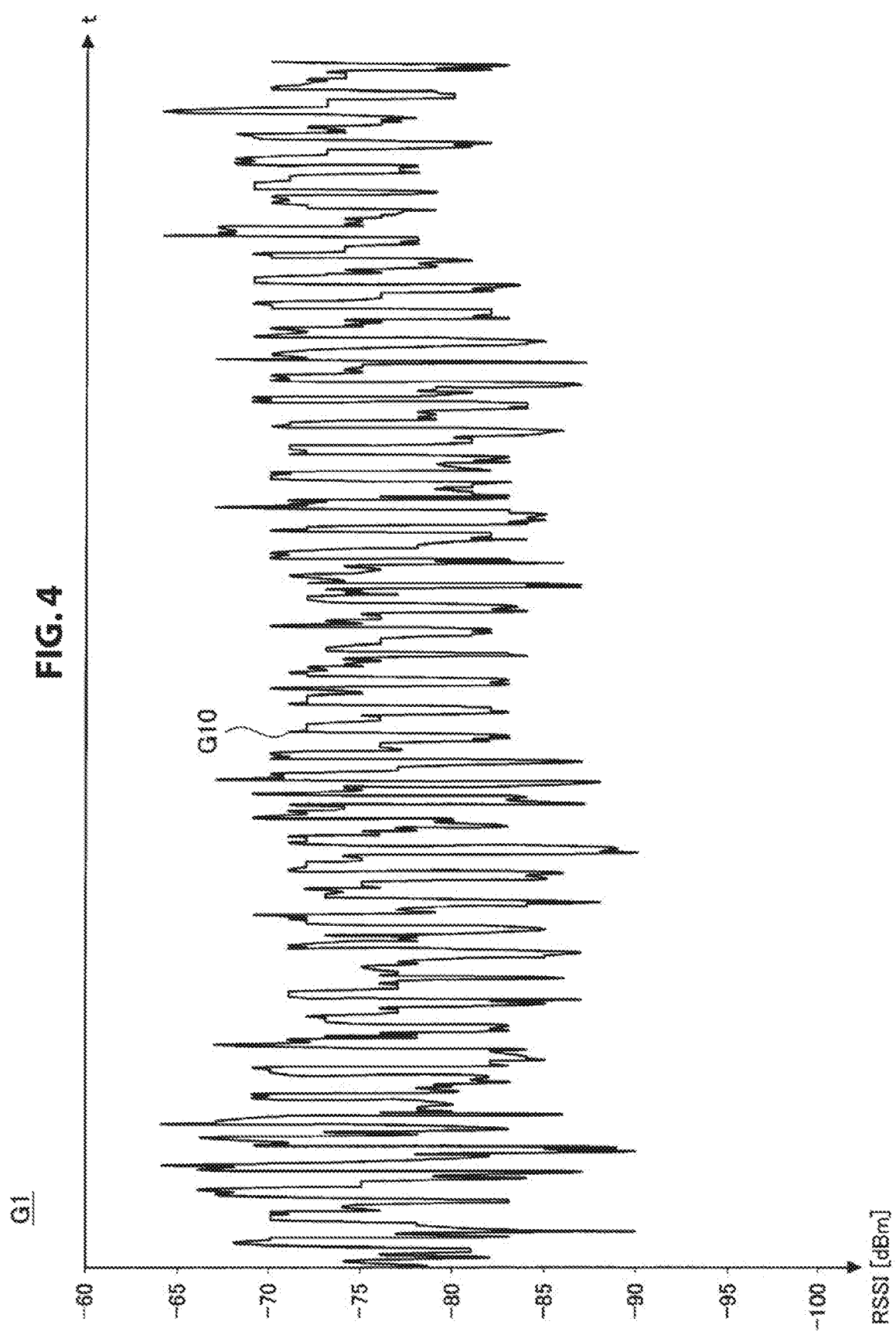
FIG. 4 is a graph illustrating an example of temporal change in an RSSI of an acquired radio wave.

FIG. 4 is a graph G1 illustrating an example of temporal change in an RSSI of an acquired radio wave. The graph G1 shows temporal change in RSSI acquisition data G10. In addition, in the graph G1, a horizontal axis represents time, and a vertical axis represents an RSSI. In addition, an interval between measurement of acquired radio waves is 0.1 to 0.3 seconds or so.

As illustrated in FIG. 4, the RSSI indicated by the acquisition data G10 repeatedly varies in a range from −64 to −90 dBm in short time, which suggests that the radio wave includes a lot of noises. For example, when converting the above described RSSI range into distance, it becomes a range from 0.5 m to 5 m. Therefore, if the acquired raw RSSI is used for distance determination, it is difficult to determine an accurate distance in units of meter.

Accordingly, as described above, the extraction unit 120 extracts a measurement result indicating an RSSI in a predetermined range from measurement results of acquired radio waves. Next, the following description is given with reference to FIG. 5 to FIG. 8.

(Sorting of RSSIs)

Figure 5:
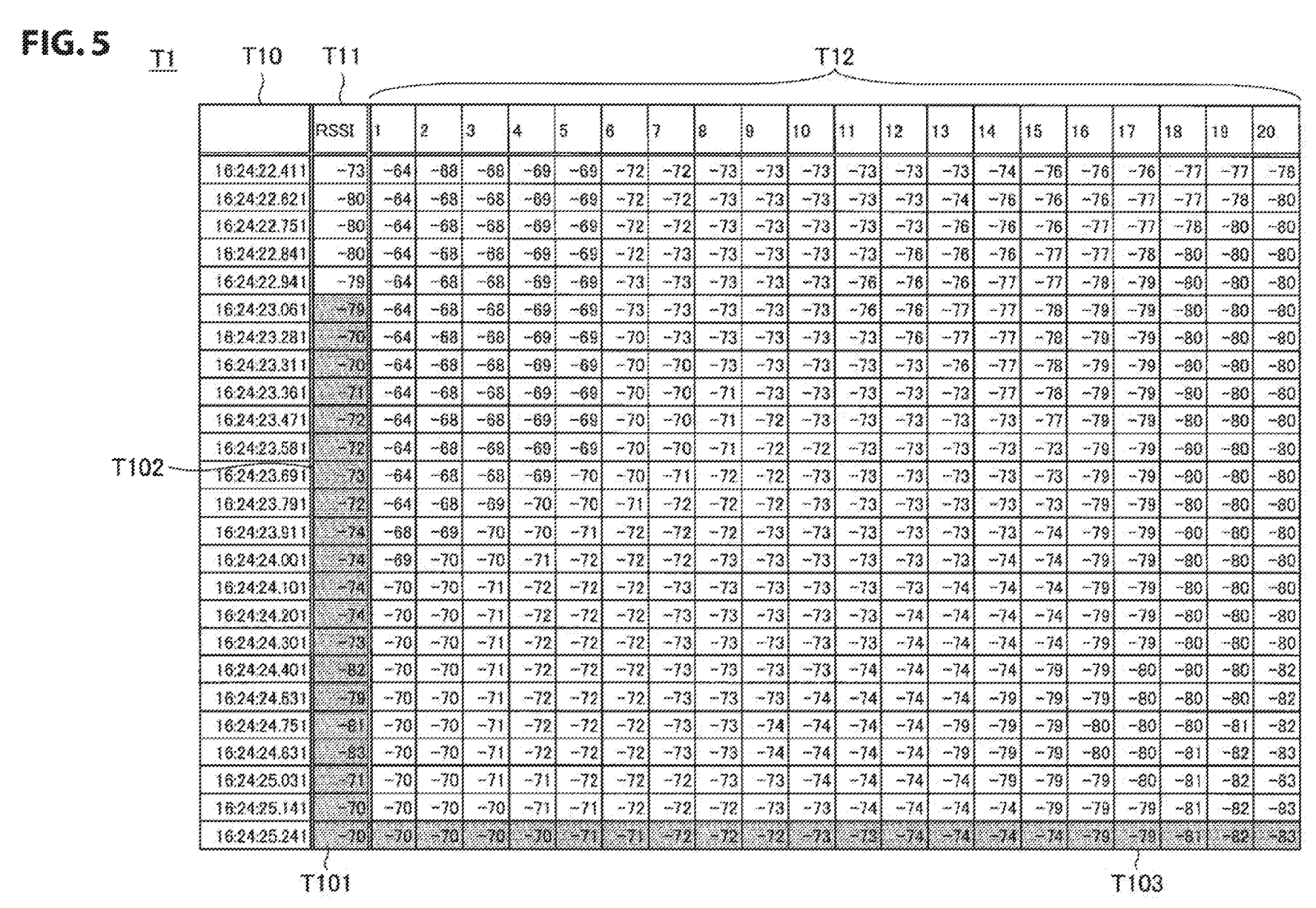

FIG. 5 is an example of a table T1 that stores values of RSSIs of a plurality of acquired radio waves that have been sorted by time. The table T1 includes a measurement time field T10, an RSSI field T11, and a sort field T12. The measurement time field T10 stores times at which the RSSIs are actually measured. The RSSI field T11 stores RSSIs at the times indicated by the measurement time field T10. For example, with reference to an RSSI value T101, the RSSI value at the latest RSSI measurement time of "16:24:25.241" is −70 dBm.

The sort field T12 stores values rank by rank. The values are obtained by sorting a plurality of RSSIs in a period including a certain radio wave measurement time indicated by the measurement field T10, in numerical-value order. For example, with reference to FIG. 5, RSSIs obtained through past 20 measurements from a certain radio wave measurement time are stored rank by rank after being sorted in numerical-value order. More specifically, the RSSIs obtained through past 20 measurements from that time are stored in descending order. For example, an RSSI with the largest value is stored in a first rank, an RSSI with a second largest value is stored in a second rank, an RSSI with a third largest value is stored in a third rank, and an RSSI with the smallest value is stored in a 20th rank.

For example, RSSIs of the past 20 measurements from the latest radio wave measurement time of "16:24:25.241" (to "16:24:23.061") are stored in the bottom row in the sort field T12. The RSSIs of the past 20 measurements are in a group T102 that is a shaded range. The extraction unit sorts the RSSIs in the group T102 in numerical-value order, and stores the sorted RSSIs in the bottom row T103 descending order. In the example illustrated in FIG. 5, RSSIs in the group whose maximum value is −70 dBm and whose minimum value is −83 dBm are sorted in numerical-value order and stored in the bottom row T103. In a similar way, RSSIs obtained through past 20 measurements from another measurement time are sorted and stored in a row in the sort field T12 corresponding to the another measurement time.

Note that, the extraction unit 120 may sort a plurality of RSSIs in a period including a certain radio wave measurement time in numerical-value order, and store data obtained through the sorting in association with the radio wave measurement time. In this case, for example, the extraction unit 120 may store the data in the storage unit 110.

Note that, the extraction unit 120 may acquire a plurality of measurement results that are used for the sorting process from the communication unit 100 or the storage unit 110.

(Standard Deviation by Rank)

Next, distribution of RSSIs stored rank by rank in the sort field T12 will be described.

Figure 6:
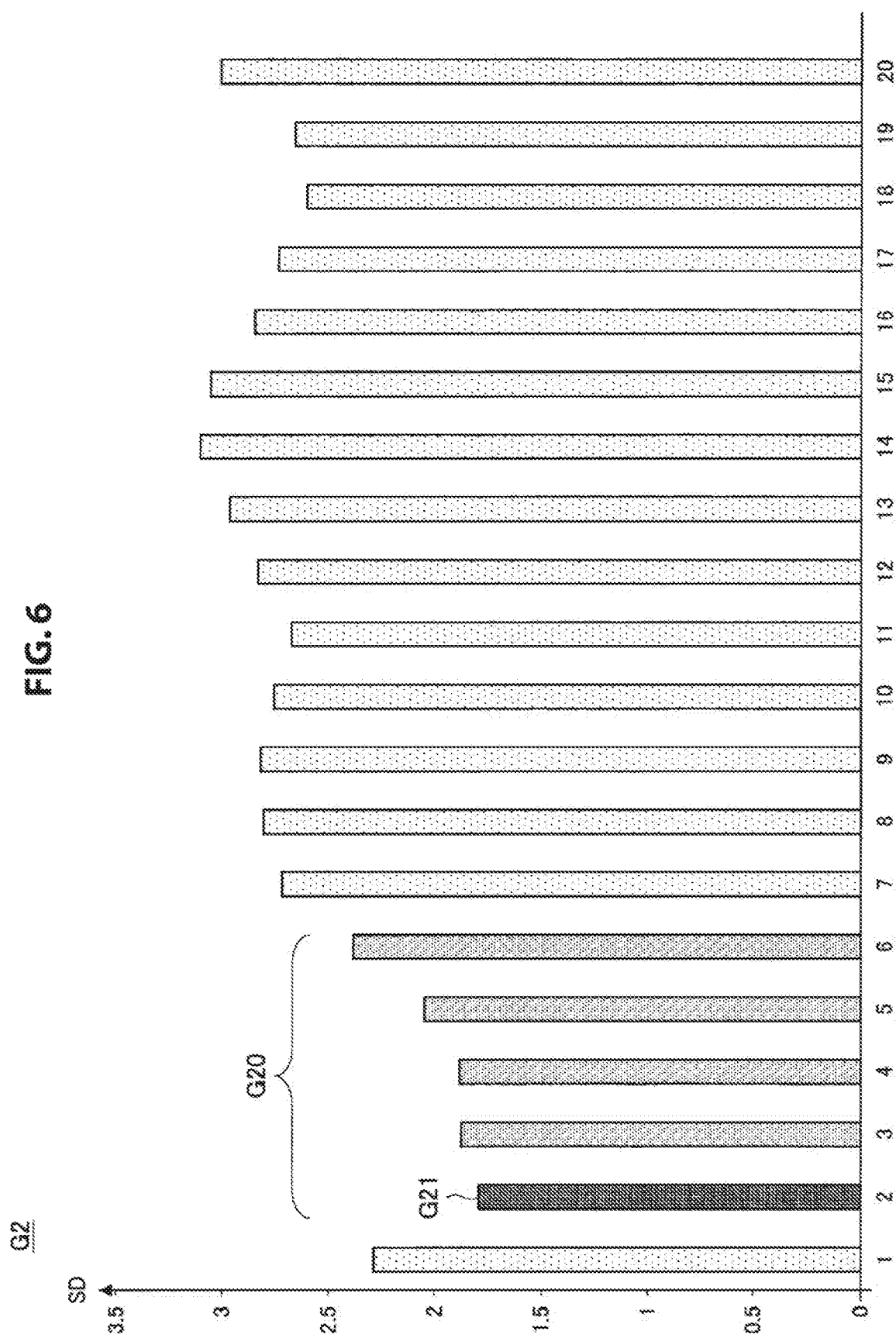
FIG. 6 is a graph illustrating an example of standard deviations calculated from a plurality of RSSIs stored rank by rank.

FIG. 6 is a graph G2 illustrating an example of standard deviations calculated from distribution of a plurality of RSSIs stored in the same ranks. In the graph G2, numbers under a horizontal axis represent ranks decided by the sorting process, and a vertical axis represents a standard deviation (SD) for each rank. Note that, the plurality of RSSIs stored in the same rank are acquired from radio wave measurement results transmitted from communication devices that are separately placed by a constant distance. Here, the number of samples for each standard deviation in the example illustrated in the graph G2 in FIG. 6 is 730.

As illustrated in FIG. 6, for example, a standard deviation group G20 including a second rank to a sixth rank that are decided by sorting indicates values lower than other standard deviations except for a first rank. In addition, the standard deviation G21 in the second rank indicates the minimum value among values of standard deviations included in the standard deviation group G20.

Like the standard deviations included in the standard deviation group G20, RSSIs stored in a rank indicating a relatively low standard deviation value have distribution with small variation in chronological order. Therefore, variation of the RSSIs stored in this rank is considered to be small. In other words, by using the RSSIs stored in a rank with a low standard deviation, it is possible to eliminate effect of variation due to noises included in original radio waves.

(RSSI Extraction)

For example, the extraction unit 120 may extract RSSIs from the second rank to the sixth rank (in other words, RSSIs included in a range from top 10% to top 30%) on the basis of values of the standard deviations illustrated in FIG. 6. This can reduce effects of variation in distribution of the plurality of acquired RSSIs.

Figure 7:
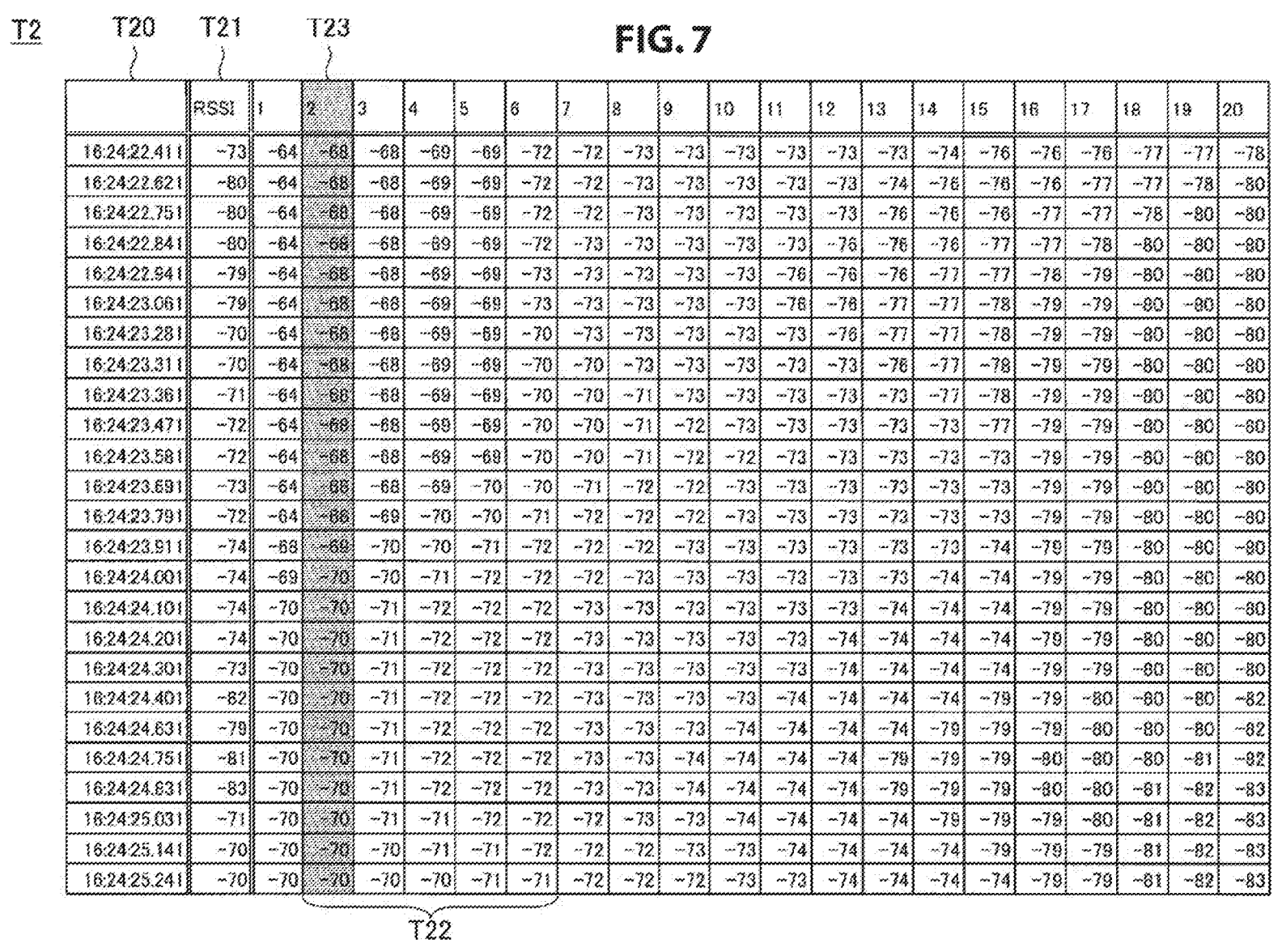

FIG. 7 is an example of a table T2 that stores values of RSSIs of a plurality of acquired radio waves that have been sorted by time. The table T2 has a configuration similar to the table T1 illustrated in FIG. 5. For example, a measurement time field T20 is the same as the measurement time field T10, and an RSSI field T21 is the same as the RSSI field T11.

Here, the extraction unit 120 extracts RSSIs included in a field T22 from a second rank to a sixth rank. For example, the extraction unit 120 may extract RSSIs stored in a second-rank field T23 from sorted RSSIs. Specifically, as illustrated in FIG. 7, the extraction unit 120 may sort a plurality of RSSIs (20 RSSIs in FIG. 7) in a period including respective measurement times, extract RSSIs stored in the second rank, and output the extracted RSSIs as RSSIs obtained at the respective measurement times.

Figure 8:
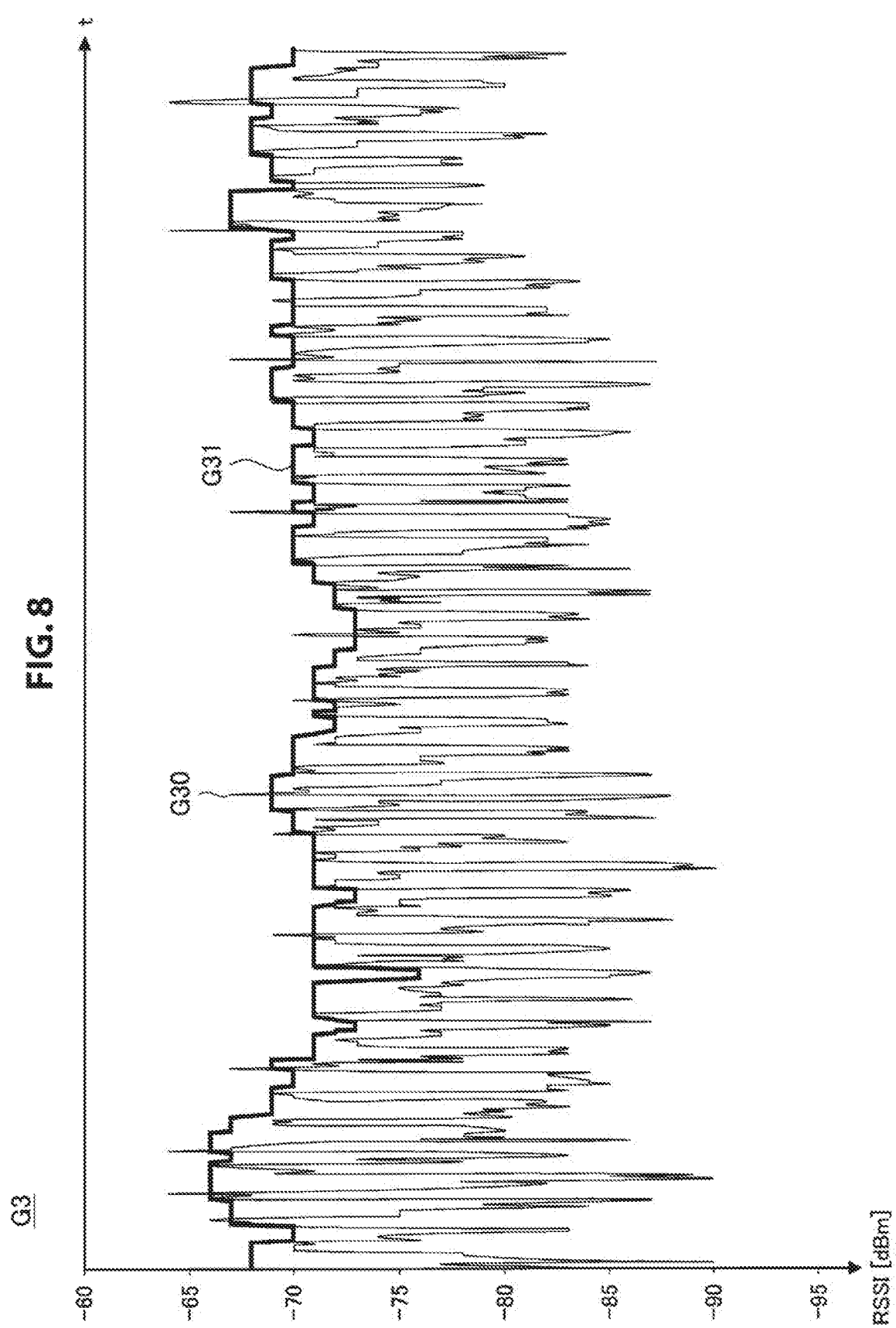
FIG. 8 is a graph illustrating an example of temporal change in an RSSI of an acquired radio wave and an RSSI extracted by an information processing device according to an embodiment of the present disclosure.

FIG. 8 is a graph G3 illustrating an example of temporal change in an RSSI of an acquired radio wave and an RSSI extracted by an information processing device according to an embodiment of the present disclosure. The graph G3 shows temporal change in RSSI acquisition data G30 and in RSSI extraction data G31 of RSSIs extracted by the extraction unit 120. In the example illustrated in FIG. 8, like the above described example, the extraction data G31 shows data on RSSIs stored in a second rank among a plurality of RSSIs. In addition, in the graph G3, a horizontal axis represents time, and a vertical axis represents an RSSI. In addition, the acquisition data G30 is the same as the acquisition data G10 illustrated in FIG. 4.

As illustrated in FIG. 8, the RSSI indicated by the acquisition data G30 varies a lot in short time, but the RSSI indicated by the extraction data G31 has stable values in comparison with the acquisition data G30. In other words, FIG. 8 shows that it is possible to eliminate effect of variation due to noises included in original radio waves by using the RSSI values stored in a rank with a low standard deviation.

As described above, it is possible to extract RSSIs with small variation due to noises by setting the RSSI extraction range of the extraction unit 120 to be a range from top 10% to top 30%. By using the RSSIs with small variation due to noises that have been extracted by the extraction unit 120, it is possible for the processing unit 130 to perform an accurate process.

(Adequacy of Extraction Range)

Note that, in the above described example, the number of measurement values that are subjected to the sorting is set to past 20 times from the measurement time. However, the present technology is not limited thereto. For example, it is possible to freely set the sorting target period in accordance with the application target, such as past 50 times or past 100 times. Herein after, it will be described that the above described RSSI extraction range of the extraction unit 120 is adequate even in the case where the number of measurement values that are subjected to the sorting is set to be 50 or 100.

—Case of 50 Measurement Values

Figure 9:
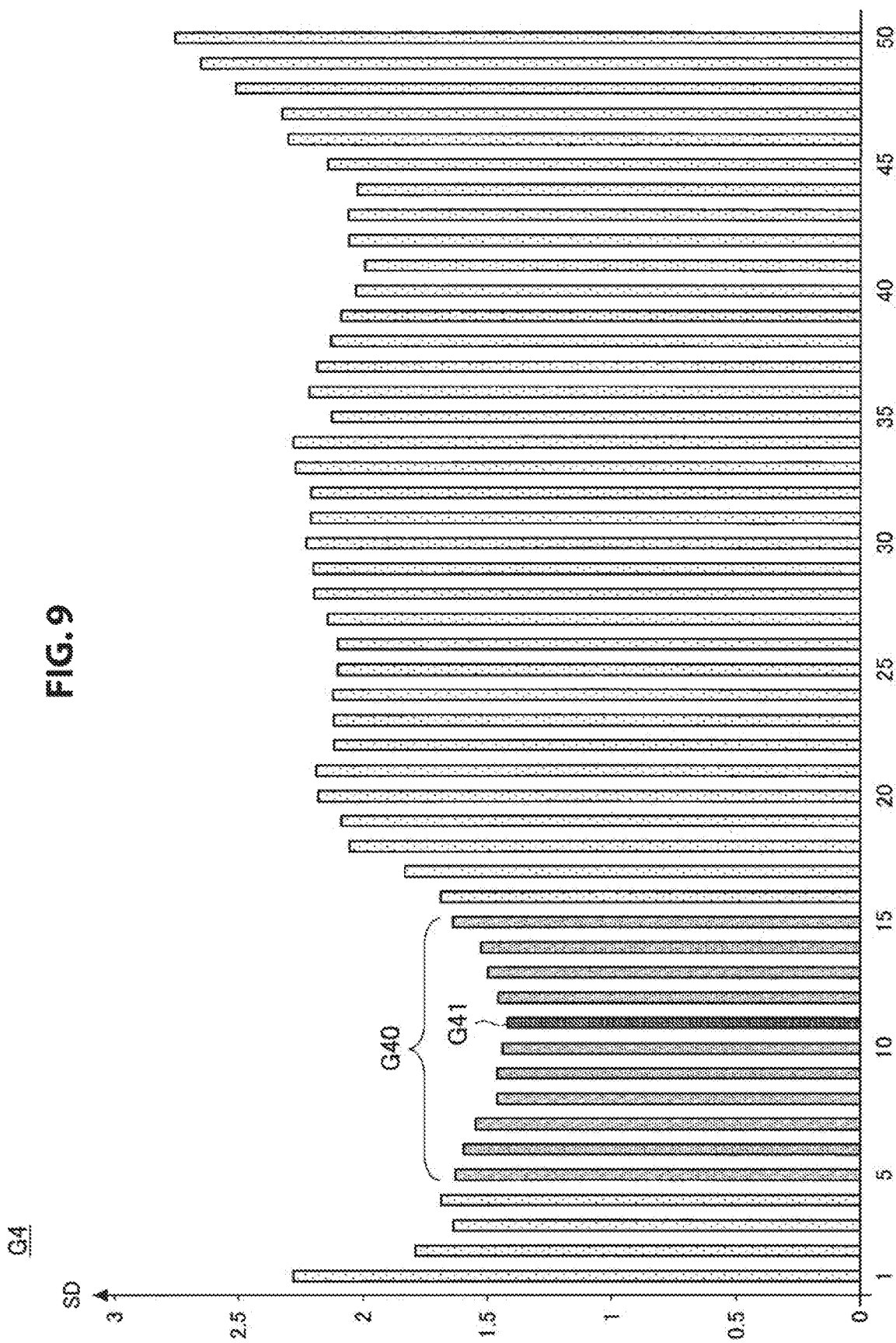
FIG. 9 is a graph illustrating an example of standard deviations calculated from a plurality of RSSIs stored rank by rank.

FIG. 9 is a graph G4 illustrating an example of standard deviations calculated from a plurality of RSSIs stored rank by rank. In the graph G4, numbers under a horizontal axis represent ranks decided through sorting. In the example illustrated in FIG. 9, it is 50. Specifically, with reference to FIG. 9, RSSIs obtained through past 50 measurements from a certain radio wave measurement time are sorted in numerical-value order, and standard deviations obtained from distribution of the RSSIs stored rank by rank are displayed rank by rank.

For example, as illustrated in FIG. 9, a standard deviation group G40 from fifth rank to 15th rank indicates values lower than the other standard deviations. In addition, the standard deviation G41 in the 11th rank indicates the minimum value among values of standard deviations included in the standard deviation group G40. Therefore, for example, with reference to the standard deviations illustrated in FIG. 9, it is adequate for the extraction unit 120 to set the extraction range from top 10% to top 30%, like the example illustrated in FIG. 6.

Figure 10:
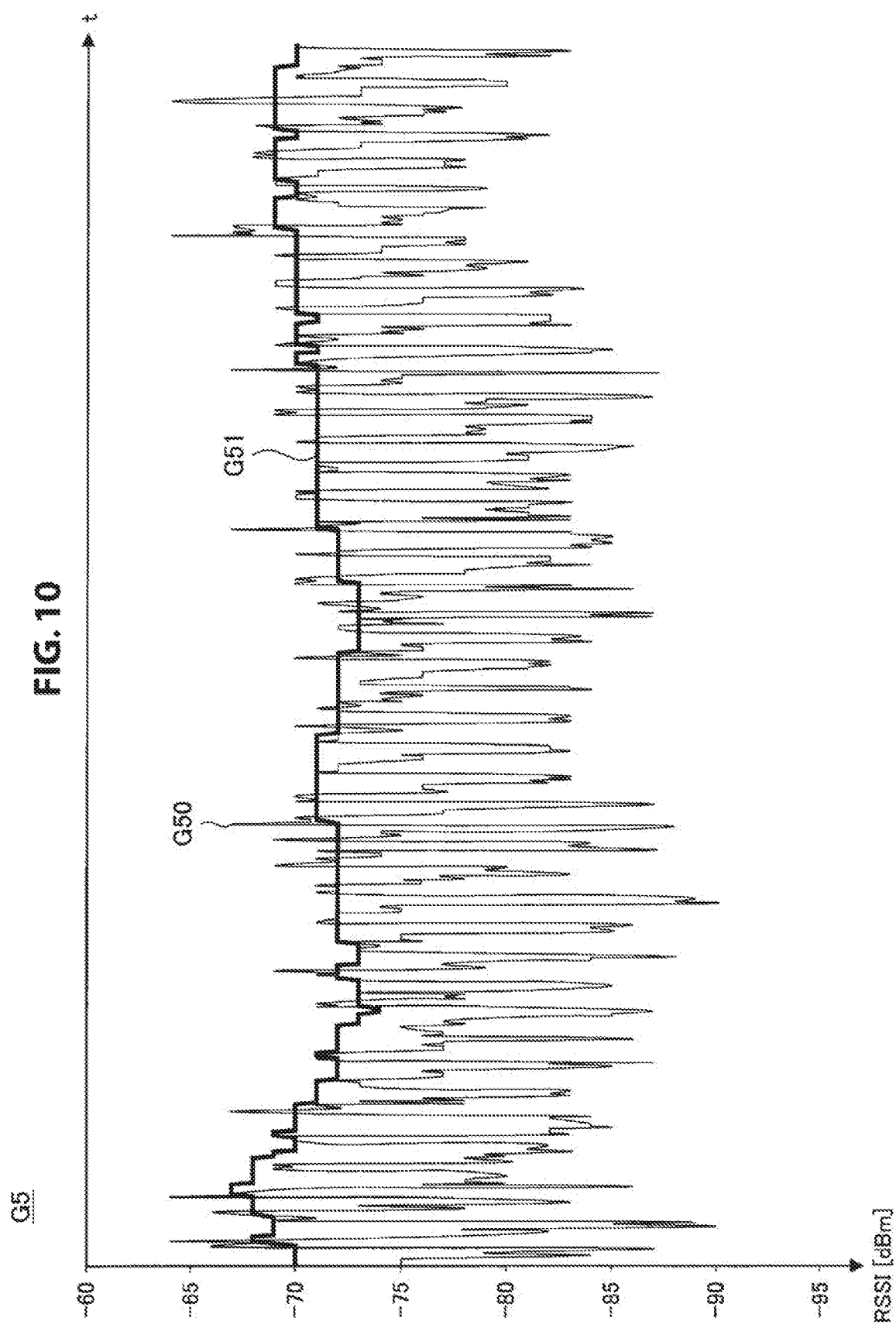
FIG. 10 is a graph illustrating an example of temporal change in an RSSI of an acquired radio wave and an RSSI extracted by an information processing device according to an embodiment of the present disclosure.

FIG. 10 is a graph G5 illustrating an example of temporal change in an RSSI of an acquired radio wave and an RSSI extracted by an information processing device according to an embodiment of the present disclosure. The graph G5 shows temporal change in RSSI acquisition data G50 and in RSSI extraction data G51 of RSSIs extracted by the extraction unit 120. In the example illustrated in FIG. 10, like the above described example, the extraction data G51 shows data on RSSIs stored in a 11th rank among a plurality of RSSIs. Note that, the acquisition data G50 is the same as the acquisition data G10 illustrated in FIG. 4.

As illustrated in FIG. 10, the extraction data G51 has stable values in comparison with the acquisition data G50. In addition, the extraction data G51 also has stable values in comparison with the extraction data G31 in the graph G3 in FIG. 8. This is because the number of parameters of the RSSI is increased in the sorting target period, and a standard deviation of a rank corresponding to the extraction data G51 (11th rank) has the lower value.

As described above, the RSSI extraction range of the extraction unit 120 set to the range from top 10% to top 30% is adequate even in the case where the past 50 measurement values are sorted.

—Case of 100 Measurement Values

Figure 11:
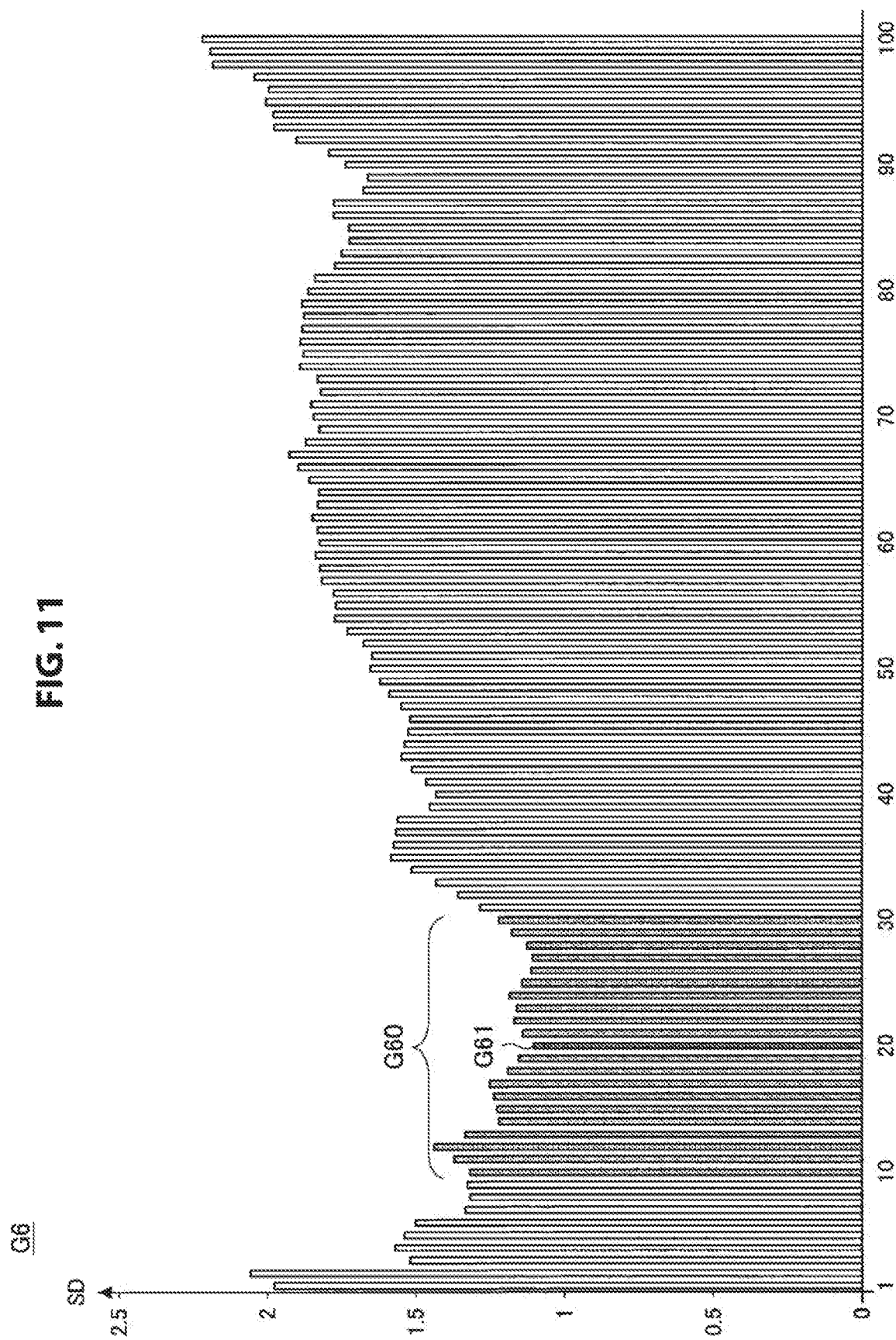
FIG. 11 is a graph illustrating an example of standard deviations calculated from a plurality of RSSIs stored rank by rank.

Next, FIG. 11 is a graph G6 illustrating an example of standard deviations calculated from a plurality of RSSIs stored rank by rank. In the graph G6, numbers under a horizontal axis represent ranks decided through sorting. In the example illustrated in FIG. 11, it is 100. Specifically, with reference to FIG. 11, RSSIs obtained through past 100 measurements from a certain radio wave measurement time are sorted in numerical-value order, and standard deviations obtained from distribution of the RSSIs stored rank by rank are displayed rank by rank.

For example, as illustrated in FIG. 11, a standard deviation group G60 from 10th rank to 30th rank indicates values lower than the other standard deviations. In addition, the standard deviation G61 in the 20th rank indicates the minimum value among values of standard deviations of the respective ranks. Therefore, for example, with reference to the standard deviations illustrated in FIG. 11, it is adequate for the extraction unit 120 to set the extraction range from top 10% to top 30%, like the example illustrated in FIG. 6.

Figure 12:
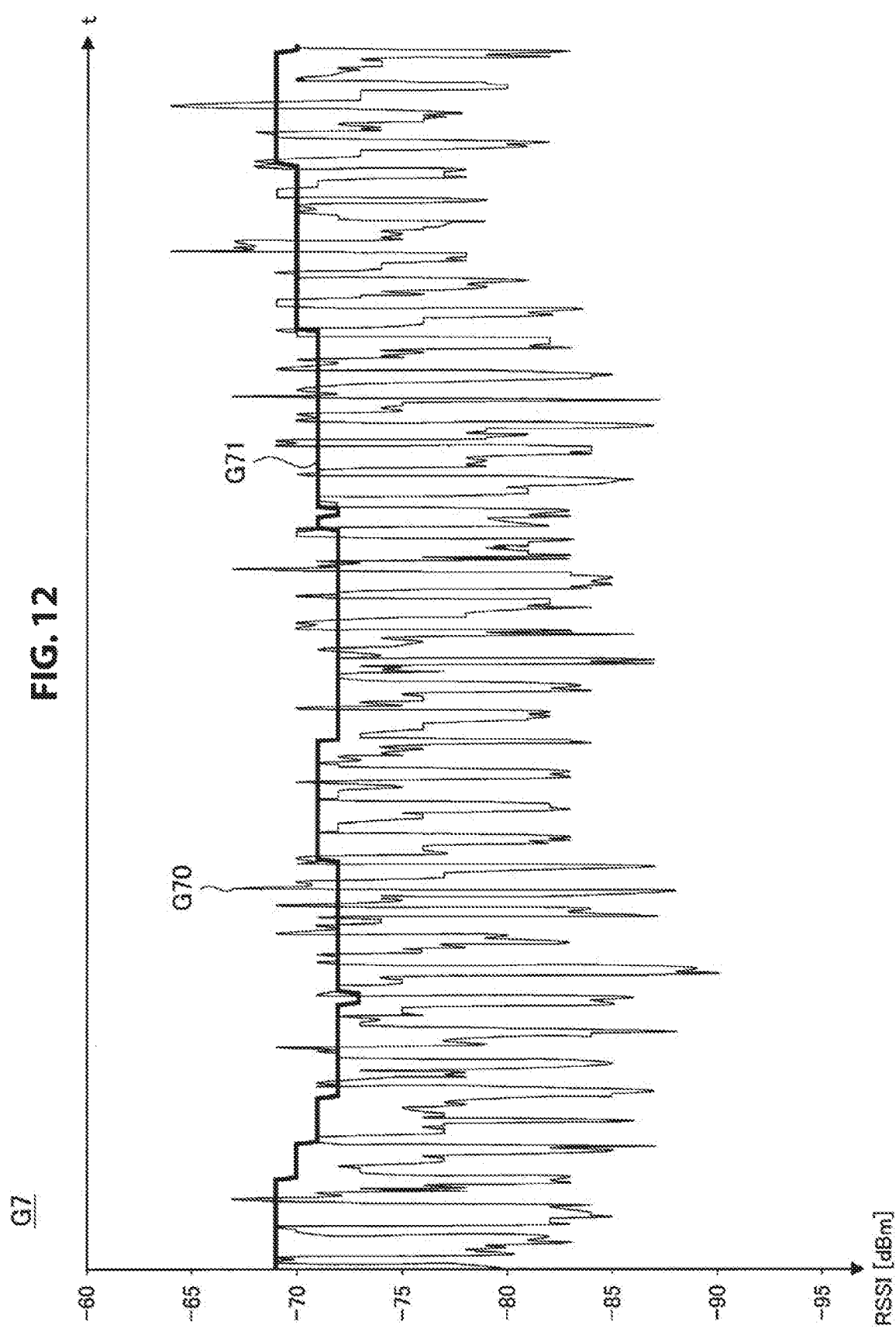
FIG. 12 is a graph illustrating an example of temporal change in an RSSI of an acquired radio wave and an RSSI extracted by an information processing device according to an embodiment of the present disclosure.

FIG. 12 is a graph G7 illustrating an example of temporal change in an RSSI of an acquired radio wave and an RSSI extracted by an information processing device according to an embodiment of the present disclosure. The graph G7 shows temporal change in RSSI acquisition data G70 and in RSSI extraction data G71 of RSSIs extracted by the extraction unit 120. In the example illustrated in FIG. 12, like the above described example, the extraction data G71 shows data on RSSIs stored in a 20th rank among a plurality of RSSIs. Note that, the acquisition data G70 is the same as the acquisition data G10 illustrated in FIG. 4.

As illustrated in FIG. 12, the extraction data G71 has stable values in comparison with the acquisition data G70. In addition, the extraction data G71 also has stable values in comparison with the extraction data G31 in the graph G3 in FIG. 8 and the extraction data G51 in the graph G5 in FIG. 10. This is because the number of parameters of the RSSI is further increased in the sorting target period, and a standard deviation of a rank corresponding to the extraction data G71 (20th rank) has the further lower value.

As described above, the RSSI extraction range of the extraction unit 120 set to the range from top 10% to top 30% is adequate even in the case where the past 100 measurement values are sorted. In other words, it is possible for the extraction unit 120 to extract RSSI values with small variation due to noises by extracting measurement results showing RSSIs included in the range from top 10% to top 30%, even in the case where the number of sorting target measurement values is freely set.

(Modification of Extraction Unit)

In the examples illustrated in FIG. 4 to FIG. 12, the extraction unit 120 extracts RSSIs included in the rage from top 10% to top 30% from a plurality of RSSIs acquired by the communication unit 100. However, RSSIs to be extracted according to the present technology are not specifically limited as long as the RSSI extraction range is within the above-described range.

For example, the extraction unit 120 may extract RSSIs included in the rage from top 15% to top 25% from a plurality of RSSIs acquired by the communication unit 100. In this case, the extraction unit 120 may further extract RSSIs of top 15% or RSSIs of top 25%. As described above, in the case where the number of sorting target measurement values is 50, the RSSI in the 11th rank (top 22%) has the minimum standard deviation. In addition, in the case where the number of sorting target measurement values is 100, the RSSI in the 20th rank (top 20%) has the minimum standard deviation. Accordingly, in this case, it is possible to extract the RSSI with small variation by selectively extracting RSSIs included in the range from top 15% to top 25%.

On the other hand, in the case where the number of sorting target measurement values is 20, the RSSI of the second rank (top 10%) has the minimum standard deviation as described above. Therefore, the case of 20 measurement values is out of the range from top 15% to top 25%. However, in the standard deviation group G20 in FIG. 6, an average value (1.93 in FIG. 6) of the standard deviations in the range from top 15% to top 25% (third rank to fifth rank) is lower than an average value (1.99 in FIG. 6) of the standard deviations in the range from top 10% to top 30% (second rank to sixth rank). Therefore, by extracting the average value of RSSIs included in the range from top 15% to top 25%, it is possible to acquire RSSIs with stable variation in comparison with extraction of a predetermined RSSI included in the range from top 10% to top 30%. Therefore, regardless of the number of sorting target measurement values, it is possible to acquire RSSIs with stable variation by extracting RSSIs included in the range from top 15% to top 25%.

In addition, the extraction unit 120 may sort a plurality of RSSIs acquired by the communication unit 100, store them rank by rank in the storage unit 110, and decide an RSSI to be extracted on the basis of distribution of the plurality of RSSI stored rank by rank. In addition, the extraction unit 120 may calculate standard deviations from the distribution of the plurality of RSSIs stored rank by rank, and extract an RSSI of a rank of the minimum standard deviation or an RSSI of a rank of a standard deviation lower than a predetermined standard. This enables extraction of RSSIs with small variation. Note that, the number of samples necessary for calculating the standard deviation is not specifically limited. For example, the number of samples may be equal to or more than the number of the sorting target measurement values. Although the standard deviation becomes more reliable as the number of samples increases, load of a standard deviation calculation process also increases. Therefore, the number of samples may be decided in accordance with usage of RSSIs. For example, in the case where the information processing device 10 performs a process on the basis of RSSIs, the number of samples may be decided depending on whether to prioritize reliability of the RSSIs or real-time performance of the RSSIs.

Note that, for example, the extraction unit 120 may perform the process of generating the distribution and calculating the standard deviations point by point in real-time, or the process may be performed in advance on the basis of values of RSSIs that have been preliminarily sorted and accumulated in numerical-value order. This enables extraction of RSSIs with small variation that follows variation in the RSSI value even if the RSSI value varies.

Alternatively, a unit other than the extraction unit 120 may perform the above-described process. For example, the communication unit 100 may sort acquired measurement results in advance when storing the measurement results in the storage unit 110, generate distribution of the RSSIs, and the extraction unit may calculate standard deviations from the distribution when performing the extraction process.

In addition, the extraction unit 120 may extract a plurality of RSSIs from RSSIs in the above-described range. For example, the extraction unit 120 may extract a plurality of RSSIs, and output a calculated value as an extraction value. The calculation value is obtained through statistical processing, such as an average value or an intermediate value of the plurality of RSSIs. This enables extraction of RSSIs with small variation. In addition, the plurality of RSSIs may be extracted as it is without the statistical processing. In addition, the processing unit 130 may use the plurality of RSSI extracted by the extraction unit 120 after the statistical processing.

In addition, the extraction unit 120 is not limited the above described examples. The extraction unit 120 may extract one or a plurality of RSSIs from RSSIs in the above described range by using various methods.

In addition, when the extraction unit 120 sorts a plurality of measurement results in a period including a first radio wave measurement time and extract one or a plurality of RSSIs, the processing unit 130 may perform a process using the extracted RSSI(s) in association with the first radio wave measurement time. For example, the processing unit 130 may perform a process for determining a distance between a communication device and a measurement position at the first radio wave measurement time, by using the RSSI(s) extracted by the extraction unit 120 from RSSIs of radio waves transmitted from the communication device. This enables reflection of temporal change in the RSSI in the process to be performed by the processing unit 130 in real-time.

<2.3. Operation>

Figure 13:
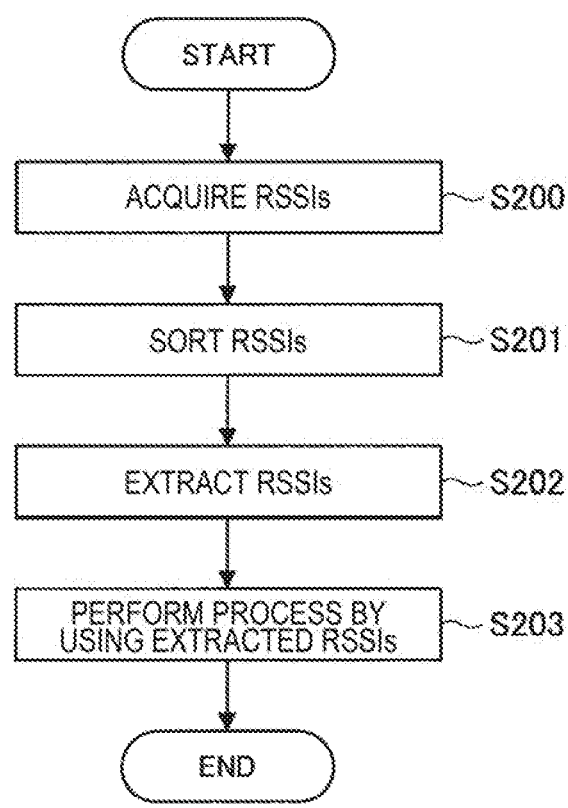
FIG. 13 is a flowchart illustrating an operation example of an information processing device according to an embodiment of the present disclosure.

FIG. 13 is a flowchart illustrating an operation example of the information processing device 10 according to the embodiment of the present disclosure. With reference to FIG. 13, the operation process of the information processing device 10 according to the embodiment will be described.

First, the communication unit 100 acquires RSSIs of measured radio waves (S200). At this time, the communication unit 100 may store the acquired radio waves in the storage unit 110 or may output them to the extraction unit 120.

Next, the extraction unit 120 acquires the plurality of RSSIs from the storage unit 110 or the communication unit 100, and sorts the RSSIs (S201). Next, the extraction unit 120 extracts RSSIs included in the range from top 10% to top 30% from the sorted RSSIs (S202). Note that, the extraction unit 120 may store the extracted RSSIs in the storage unit 110 or may output them to the processing unit 130.

Next, the processing unit 130 acquires the RSSIs extracted by the extraction unit 120 from the storage unit 110 or the communication unit 100, and performs a predetermined process by using the RSSIs (S203).

<2.4. Supplement>

The configuration and operation of the information processing device 10 according to the embodiment have been described above. In addition, specifically, details of RSSI extraction means of the extraction unit 120 in the information processing device 10 according to the embodiment have been described above. For example, it is possible to perform a process based on an RSSI with small temporal variation, by setting the range of RSSIs to be extracted by the extraction unit 120 to the range from top 10% to top 30% of values indicated by the RSSIs.

Note that, as illustrated in FIG. 8, FIG. 10, and FIG. 12, temporal variation of RSSIs to be extracted by the extraction unit 120 becomes smaller as the number of sorting target measurement values increases. In other words, extracted RSSIs become more stable as the number of measurement values increases.

However, on the other hand, due to increase in the number of the measurement values, the extracted RSSI values change with time lag when actual RSSIs change such as a distance from a communication device that transmits radio waves changes. Specifically, the time lag increases when the RSSIs decrease. This is because the extraction unit 120 extracts RSSIs included in the range from top 10% to top 30%, and therefore reflection of the reduced RSSI starts from a sorted RSSI with low rank in the case where the RSSI decreases.

Accordingly, for example, the number of sorting target measurement values may be set depending on whether to prioritize reliability or real-time performance of the RSSIs to be extracted by the extraction unit 120. Specifically, the number of sorting target measurement values may be decreased in the case where quick detection is necessary in distance measurement, and the number of the sorting target measurement values may be increased in the case where accurate measurement is necessary.

In addition, according to the embodiment, the RSSI extraction range of the extraction unit 120 is set to the range from top 10% to top 30% of a plurality of sorted RSSIs. However, the present technology is not limited thereto. For example, it is also assumed that a size or temporal change in an RSSI to be acquired differs in accordance with a wireless communication frequency band of a radio wave to be acquired by the information processing device 10, or in accordance with the number of barriers in a space in which the radio wave propagates. In such a case, it is possible to appropriately change the RSSI extraction range.

3. Operation of Information Processing System According to Embodiment

The configuration and operation of the information processing device 10 according to the embodiment have been described above. Next, details of operation of information processing system 1 including the above described information processing device 10 will be described. By using the RSSI with small temporal variation that has been extracted by the extraction unit 10, it is possible for the information processing system 1 to determine an accurate communication distance between devices. Next, with reference to FIG. 14 to FIG. 21, first to fourth operation examples of the information processing system 1 will be described.

<3.1. First Operation Example>

Figure 14:
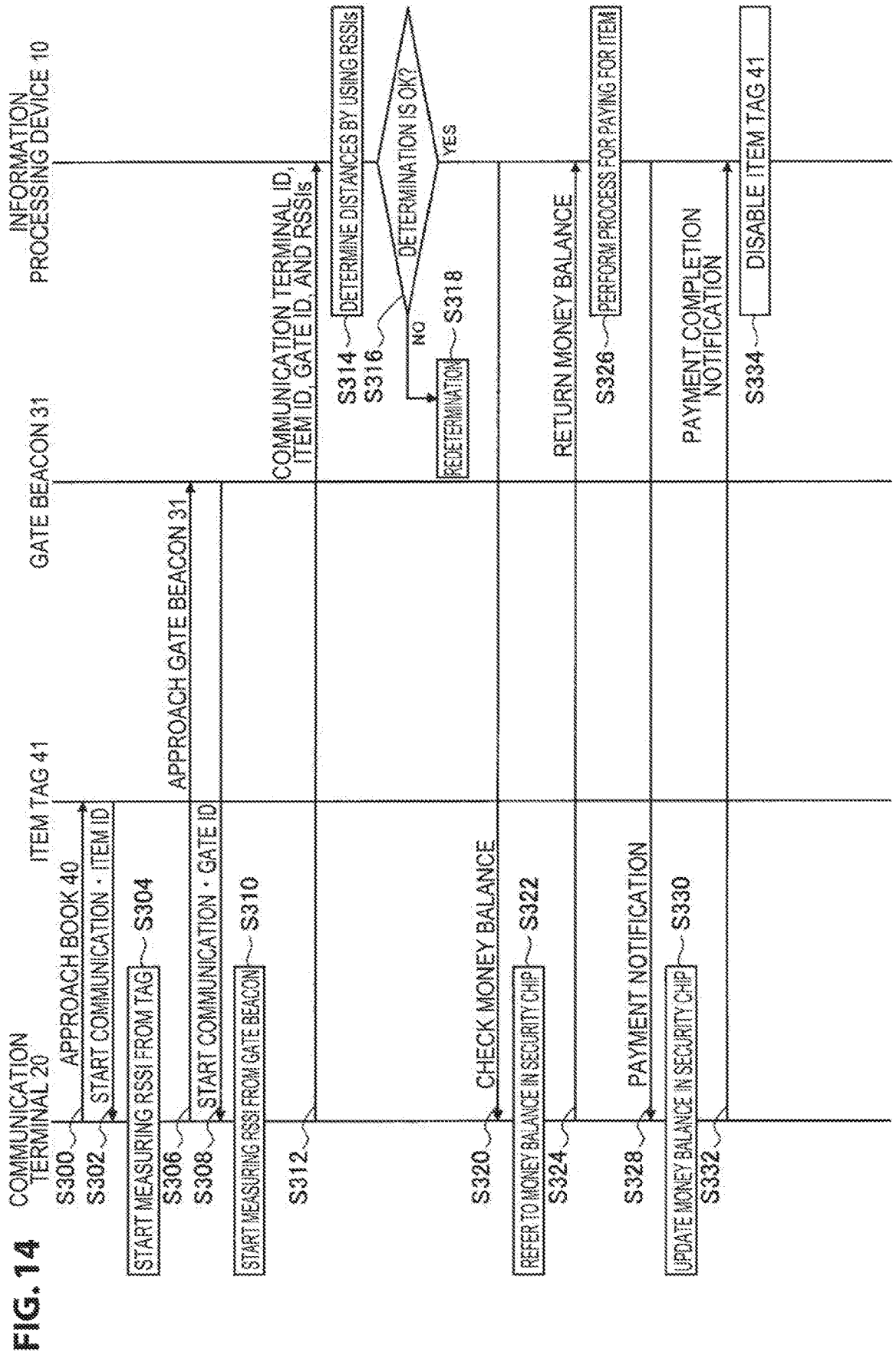
FIG. 14 is a sequence diagram illustrating a first operation example of an information processing system according to an embodiment of the present disclosure.

FIG. 14 is a sequence diagram illustrating a first operation example of the information processing system 1 according to the embodiment of the present disclosure. Here a case will be described in which the communication terminal 20 transmits, to the information processing device 10, a gate ID of the gate beacon 31, an item ID of the book 40, and RSSIs of radio waves in communication with the gate beacon 31 and the item tag 41.

First, when the communication terminal 20 approaches the book 40 to which the item tag 41 is attached (S300), the communication terminal 20 starts communication with the item tag 41 and acquires the item ID from the item tag 41 (S302). In addition to the start of communication with the item tag 41, the communication terminal 20 also starts measuring an RSSI of a radio wave in communication with the item tag 41 (S304).

Here, it is assumed that a user with the communication terminal 20 approaches the gate beacon 31 with the book 40 to which the item tag 41 is attached in his/her hand. When the communication terminal 20 approaches the gate beacon 31 (S306), the communication terminal 20 starts communication with the gate beacon 31 and acquires the gate ID from the gate beacon 31 (S308). In addition to the start of communication with the gate beacon 31, the communication terminal 20 also starts measuring an RSSI of a radio wave in communication with the gate beacon 31 (S310).

Next, the communication terminal 20 transmits a communication terminal ID of the communication terminal 20, the item ID, the gate ID, and the measured RSSIs to the information processing device 10 (S312). The communication terminal 20 may transmit the pieces of information to the information processing device 10 continuously or intermittently after communication between the communication terminal 20 and the gate beacon 31 starts, or the communication terminal 20 may transmit the pieces of information to the information processing device 10 continuously or intermittently before the communication with the gate beacon 31 starts.

After the acquisition of the pieces of information, the information processing device 10 determines a communication distance between the communication terminal 20 and the item tag 41 and a communication distance between the communication terminal 20 and the gate beacon 31 by using the RSSIs extracted by the extraction unit 120 (S314). In the case where a result of the determination does not satisfy a predetermined condition (NO in S316), the information processing device 10 returns to Step S312 to reacquire RSSIs from the communication terminal 20 and redetermine the distances (S318). For example, the predetermined condition may be a condition that the distance between the communication terminal 20 and the gate beacon 31 is a first threshold or less and the distance between the communication terminal 20 and the item tag 41 is a second threshold or less. Note that, settings of these thresholds are not specifically limited. In addition, the redetermination may be repeated until a result of the redetermination satisfies the predetermined condition or until the communication terminal 20 stops communication with the gate beacon 31 or the item tag 41.

In the case where the result of the determination satisfies the predetermined condition (YES in S316), the information processing device 10 starts a process for paying for the book 40 to which the item tag 41 is attached. Specifically, the information processing device 10 instructs the communication terminal 20 to check a money balance in the security chip of the communication terminal 20 (S320). The communication terminal 20 refers to the money balance in the security chip (S322), and returns the money balance that has been referred to the information processing device 10 (S324). Next, in the case where the returned money balance indicates the money equivalent to a price of the book 40 or more, the information processing device 10 performs the process for paying for the book 40 (S326). Note that, in the case where the money balance indicates the money less than the price of the book 40, the information processing device 10 may instruct the gate beacon 31 to close the flapper or door of the gate 30 or to output an alarm screen or an alarm sound, for example. In addition, in such a case, the information processing device 10 may instruct the output unit of the communication terminal 20 to output the alarm screen or alarm display to the user.

In the case where the payment process is carried out normally, the information processing device 10 issues a payment notification to the communication terminal 20 (S328). In response to the payment notification, the communication terminal 20 updates the money balance in the security chip (S330). Next, the communication terminal 20 notifies the information processing device 10 that the money balance is updated and the payment is finished (S332). In addition, in response to the notification, the information processing device 10 may disable the item tag 41 attached to the book 41 for which payment is finished (S334).

According to the above described configuration and operation, a user with the communication terminal 20 can pay for the book 40 simply by going through the gate 30 with the book 40 to which the item tag 41 is attached in his/her hand.

<3.2. Second Operation Example>

The first operation example of the information processing system 1 has been described above. Next, the second operation example of the information processing system 1 will be described.

Figure 15:
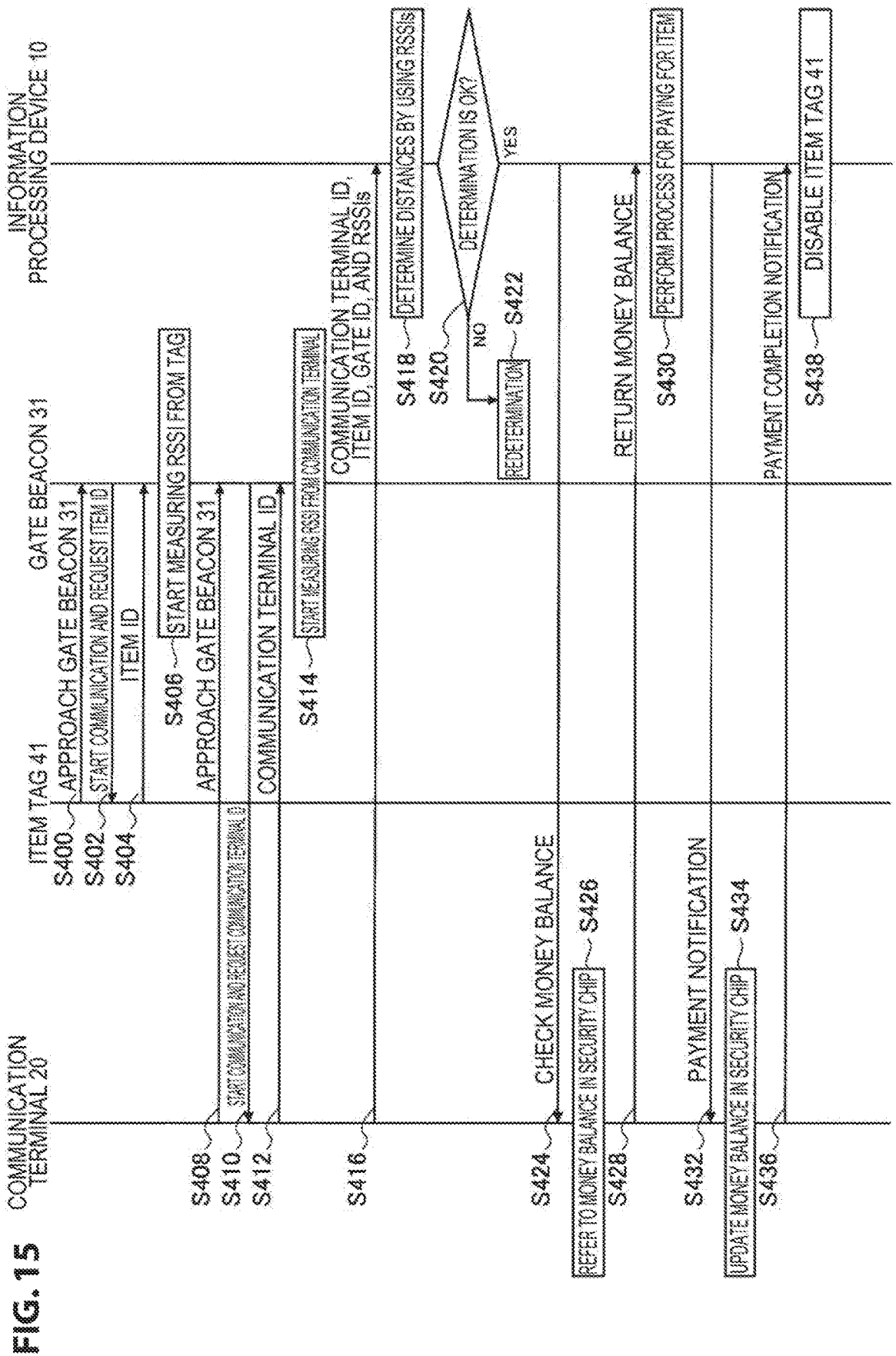
FIG. 15 is a sequence diagram illustrating a second operation example of an information processing system according to an embodiment of the present disclosure.

FIG. 15 is a sequence diagram illustrating a second operation example of the information processing system 1 according to the embodiment of the present disclosure. Here, a case will be described in which the gate beacon 31 transmits, to the information processing device 10, the communication terminal ID of the communication terminal 20, the item ID of the book 40, and RSSI measurement values of radio waves in communication with the communication terminal 20 and the item tag 41.

First, when the item tag 41 attached to the book 40 approaches the gate beacon 31 (S400), the gate beacon 31 starts communication with the item tag 41 and requests the item ID from the item tag 41 (S402). Next, the gate beacon 31 acquires the item ID from the item tag (S404). In addition to the start of communication with the item tag 41, the gate beacon 31 also starts measuring an RSSI of a radio wave in communication with the item tag 41 (S406).

In addition, it is assumed that a user with the communication terminal 20 approaches the gate beacon 31 with the book 40 to which the item tag 41 is attached in his/her hand. When the communication terminal 20 approaches the gate beacon 31 (S408), the communication terminal 20 starts communication with the gate beacon 31, and the gate beacon 31 requests the communication terminal ID from the communication terminal 20 (S410). Next, the gate beacon 31 acquires the communication terminal ID from the communication terminal 20 (S412). In addition to the start of communication with the communication terminal 20, the gate beacon 31 also starts measuring an RSSI of a radio wave in communication with the communication terminal 20 (S414).

Subsequently, the gate beacon 31 transmits the communication terminal ID, the item ID, the gate ID of the gate 30 including the gate beacon 31, and the measured RSSIs to the information processing device 10 (S416). The gate beacon 31 may transmit the pieces of information to the information processing device 10 continuously or intermittently after communication between the communication terminal 20 and the gate beacon 31 starts, or the gate beacon 31 may transmit the pieces of information to the information processing device 10 continuously or intermittently before the communication with the communication terminal 20 starts.

After the acquisition of the pieces of information, the information processing device 10 determines a communication distance between the gate beacon 31 and the communication terminal 20 and a communication distance between the gate beacon 31 and the item tag 41 by using the RSSIs extracted by the extraction unit 120 (S418). In the case where a result of the determination does not satisfy a predetermined condition (NO in S420), the information processing device 10 returns to Step S416 to reacquire RSSIs from the gate beacon 31 and redetermine the distances (S422). For example, the predetermined condition may be a condition that the distance between the communication terminal 20 and the gate beacon 31 is a third threshold or less and the distance between the gate beacon 31 and the item tag 41 is a fourth threshold or less. Settings of these thresholds are not specifically limited. In addition, the redetermination may be repeated until a result of the redetermination satisfies the predetermined condition or until the gate beacon 31 stops communication with the communication terminal 20 or the item tag 41.

In the case where the result of the determination satisfies the predetermined condition (YES in S420), the information processing device 10 starts a process for paying for the book 40 to which the item tag 41 is attached. Next, the process in Step S424 to Step S438 is the same as the process in Step S320 to Step S334 in the first operation example, and the repeated description will be omitted.

According to the above described configuration and operation, a user with the communication terminal 20 can pay for the book 40 simply by going through the gate 30 with the book 40 to which the item tag 41 is attached in his/her hand. In this case, the gate beacon 31 fills the main role. Therefore, it is possible to reduce load for the communication terminal 20 at the time of communication and acquisition of RSSIs, for example.

<3.3. Third Operation Example>

The second operation example of the information processing system 1 has been described above. Next, the third operation example of the information processing system 1 will be described.

Figure 16:
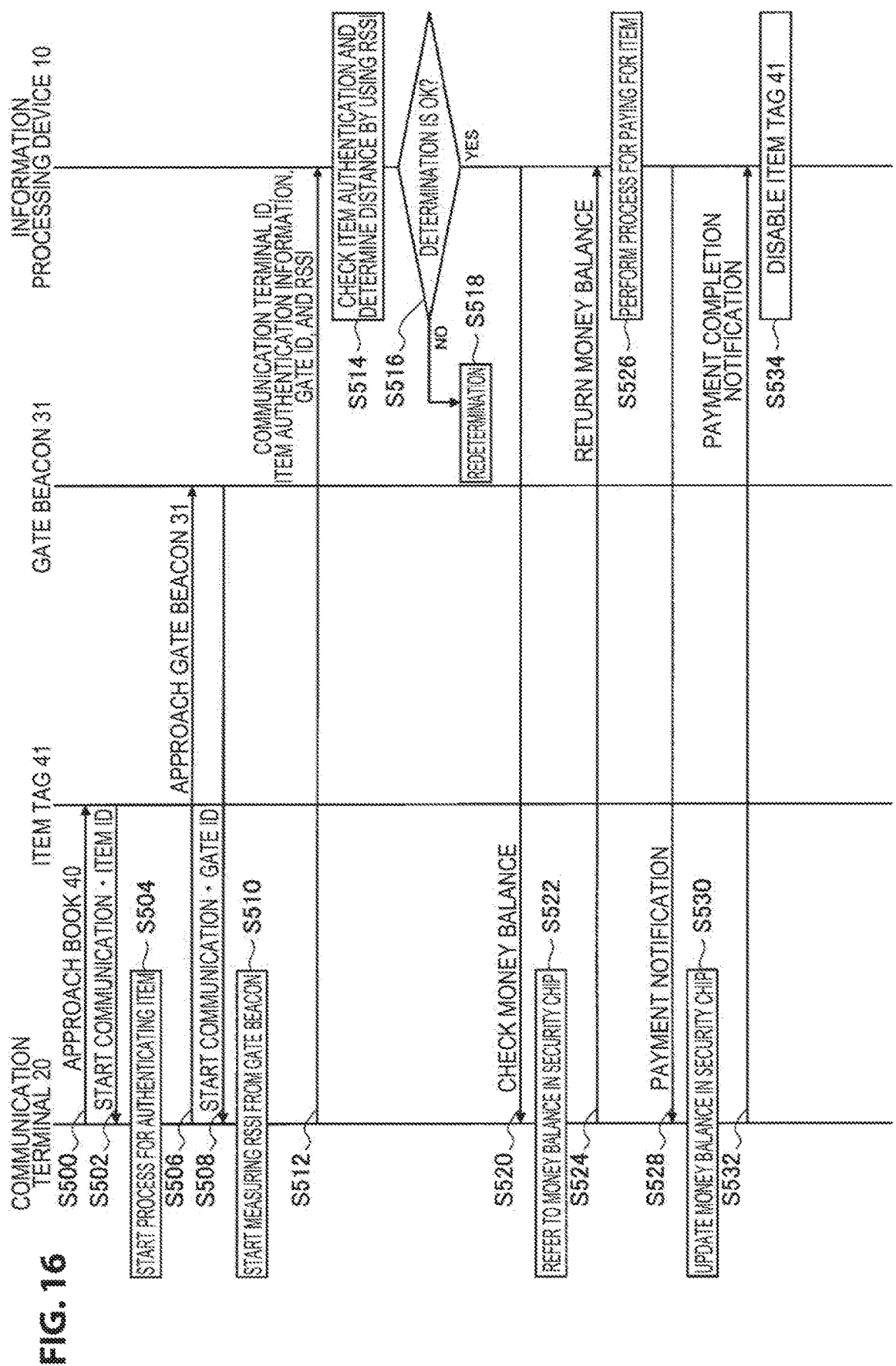
FIG. 16 is a sequence diagram illustrating a third operation example of an information processing system according to an embodiment of the present disclosure.

FIG. 16 is a sequence diagram illustrating the third operation example of the information processing system 1 according to the embodiment of the present disclosure. Here, a case will be described in which the communication terminal 20 performs a process for authenticating the book 40 and the information processing device 10 determines authenticated information acquired through the authentication process.

First, when the communication terminal 20 approaches the book 40 to which the item tag 41 is attached (S500), the communication terminal 20 starts communication with the item tag 41 and acquires the item ID from the item tag 41 (S502).

After the acquisition of the item ID, the communication terminal 20 starts the process for authenticating the book 40 associated with the item ID, on the basis of an RSSI in communication with the item tag 41 attached to the book 40 (S504). For example, the process for authenticating the book 40 performed by the communication terminal 20 may be divided into two authentication processes (to be described later). Note that, details of the two authentication processes will be described in "3.3.1. Configuration and operation related to first authentication process" and "3.3.2. Configuration and operation related to second authentication process".

It is assumed that a user with the communication terminal 20 approaches the gate beacon 31 with the book 40 that has been authenticated by the communication terminal 20 in his/her hand. When the communication terminal 20 approaches the gate beacon 31 (S506), the communication terminal 20 starts communication with the gate beacon 31 and acquires the gate ID from the gate beacon 31 (S508). In addition to the start of communication with the gate beacon 31, the communication terminal 20 also starts measuring an RSSI of a radio wave in communication with the gate beacon 31 (S510).

Next, the communication terminal 20 transmits the communication terminal ID of the communication terminal 20, the gate ID, the authentication information of the book 40, and the measured RSSI to the information processing device 10 (S512). Note that, the authentication information includes the item ID for identifying the book 40, for example.

After the acquisition of the pieces of information, the information processing device 10 performs check and determination as described below (S514). First, the information processing device 10 checks the authentication information related to the book 40 of the communication terminal 20. Specifically, the information processing device 10 checks whether there is an item authenticated by the communication terminal 20, and checks the item ID of the item in the case where there is the authenticated item. In addition, the information processing device 10 determines a communication distance between the communication terminal 20 and the gate beacon 31 by using the RSSI extracted by the extraction unit 120.

In the case where a result of the check and a result of the determination do not satisfy predetermined conditions (NO in S516), the information processing device 10 returns to Step S512 to reacquire and redetermine an RSSI and authentication information related to the book 40 from the communication terminal 20 (S518). Note that, the case where a result of the check does not satisfy a predetermined condition means a case where no book is authenticated by the communication terminal 20 (in other words, a case where it is determined that the user does not have any book).

In the case where the result of the determination satisfies the predetermined condition (YES in S516), the information processing device 10 starts a process for paying for the book 40 to which the item tag 41 is attached. Next, the process in Step S520 to Step S534 is the same as the process in Step S320 to Step S334 in the first operation example, and the repeated description will be omitted.

According to the above described configuration and operation, a user with the communication terminal 20 can pay for the book 40 simply by going through the gate 30 with the book 40 to which the item tag 41 is attached in his/her hand. In this case, the communication terminal 20 determines the communication distance from the item tag 41 attached to the book 41. Therefore, it is only necessary for the information processing device 10 to determine the communication distance between the communication terminal 20 and the gate beacon 31. This reduces load for the information processing device 10 at the time of determination of communication distances. Therefore, it is possible to allow the information processing device 10 to communicate with more communication terminals 20.

Next, configuration and operation related to the process for authenticating the book 40 performed by the communication terminal 20 according to the third operation example will be described. As described above, the communication terminal 20 may perform the process for authenticating the book 40 on the basis of an RSSI in communication with the item tag 41 attached to the book 40. However, the communication distance between the communication terminal 20 and the item tag 41 varies depending on a way of holding the communication terminal 20 and the book 40 by the user. Therefore, by using at least any of the following two means, it is possible for the communication terminal 20 to perform the process for authenticating the book 40 regardless of the way of holding the communication terminal 20 and the book 40.

(3.3.1. Configuration and Operation Related to First Authentication Process)
(Configuration)

Figure 17:
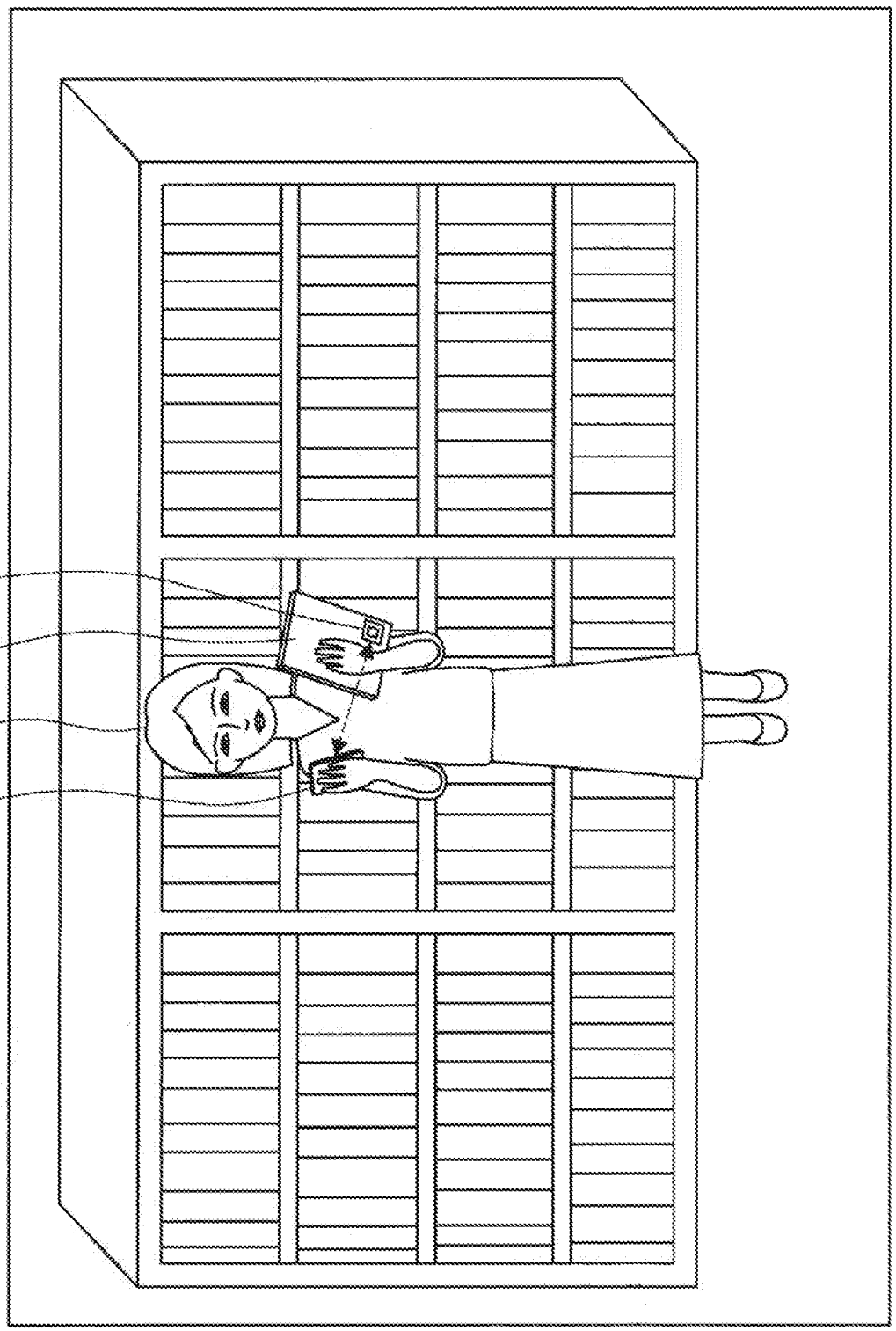
FIG. 17 is a diagram illustrating a configuration related to a first authentication process of a communication terminal according to the third operation example.

First, configuration and operation related to the first authentication process for authenticating the book 40 performed by the communication terminal 20 will be described. FIG. 17 is a diagram illustrating a configuration related to the first authentication process of the communication terminal 20 according to the third operation example. As illustrated in FIG. 17, in the configuration related to the first authentication process, it is assumed that a person P1 is holding the communication terminal 20 and the book 40 to which the item tag 41 is attached in her respective hands.

In the case where the person P1 moves with the communication terminal 20 in one hand and the book 40 in the other hand, the communication terminal 20 and the item tag 41 are close to each other while the person P1 is on the move. Therefore, in the case where the communication terminal 20 determines that the communication distance from the item tag 41 is within a predetermined range, the communication terminal 20 may authenticate the book 40 to which the item tag 41 is attached. Alternatively, in the case where the communication terminal 20 determines that the communication distance from the item tag 41 is out of the predetermined range, the communication terminal 20 may cancel the authentication of the book 40 to which the item tag 41 is attached.

(Operation)

Figure 18:
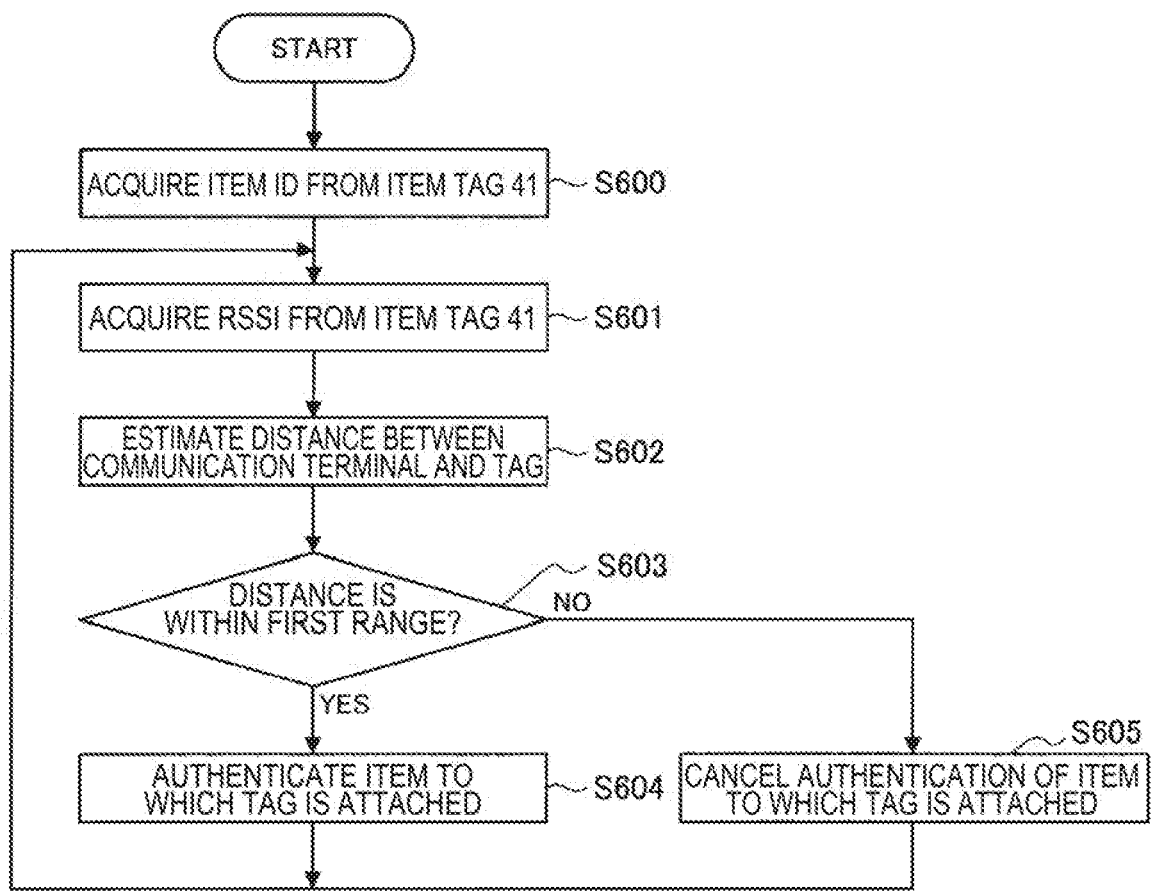
FIG. 18 is a flowchart illustrating operation based on the configuration related to the first authentication process of the communication terminal according to the third operation example.

FIG. 18 is a flowchart illustrating operation based on a configuration related to the first authentication process of the communication terminal 20 according to the third operation example. First, the communication terminal 20 acquires the item ID from the approaching item tag 41 (S600), and acquires an RSSI of a radio wave in the communication with the item tag 41 (S601). Note that, operation in Step S600 is the same as the operation in Step S502 in the sequence diagram in FIG. 16. Next, the communication terminal 20 estimates a distance from the item tag 41 on the basis of the acquired RSSI (S602).

Next, for example, in the case where the communication distance estimated by the communication terminal 20 is within a first range (YES in S603), the communication terminal 20 may authenticate the book 40 to which the item tag 41 is attached (S604). On the other hand, in the case where the communication distance exceeds the first range (NO in S603), the communication terminal 20 cancels authentication of the book 40 if the book 40 to which the item tag 41 is attached has already been authenticated (S605).

After Step S604 or Step S605 finishes, the communication terminal 20 returns to Step S601 and acquires an RSSI from the item tag 41 again. This operation may be repeatedly performed until the book 40 to which the item tag 41 is attached is subjected to the payment process or communication between the communication terminal 20 and the item tag 41 is disconnected.

(3.3.2. Configuration and Operation Related to Second Authentication Process)
(Configuration)

Figure 19:
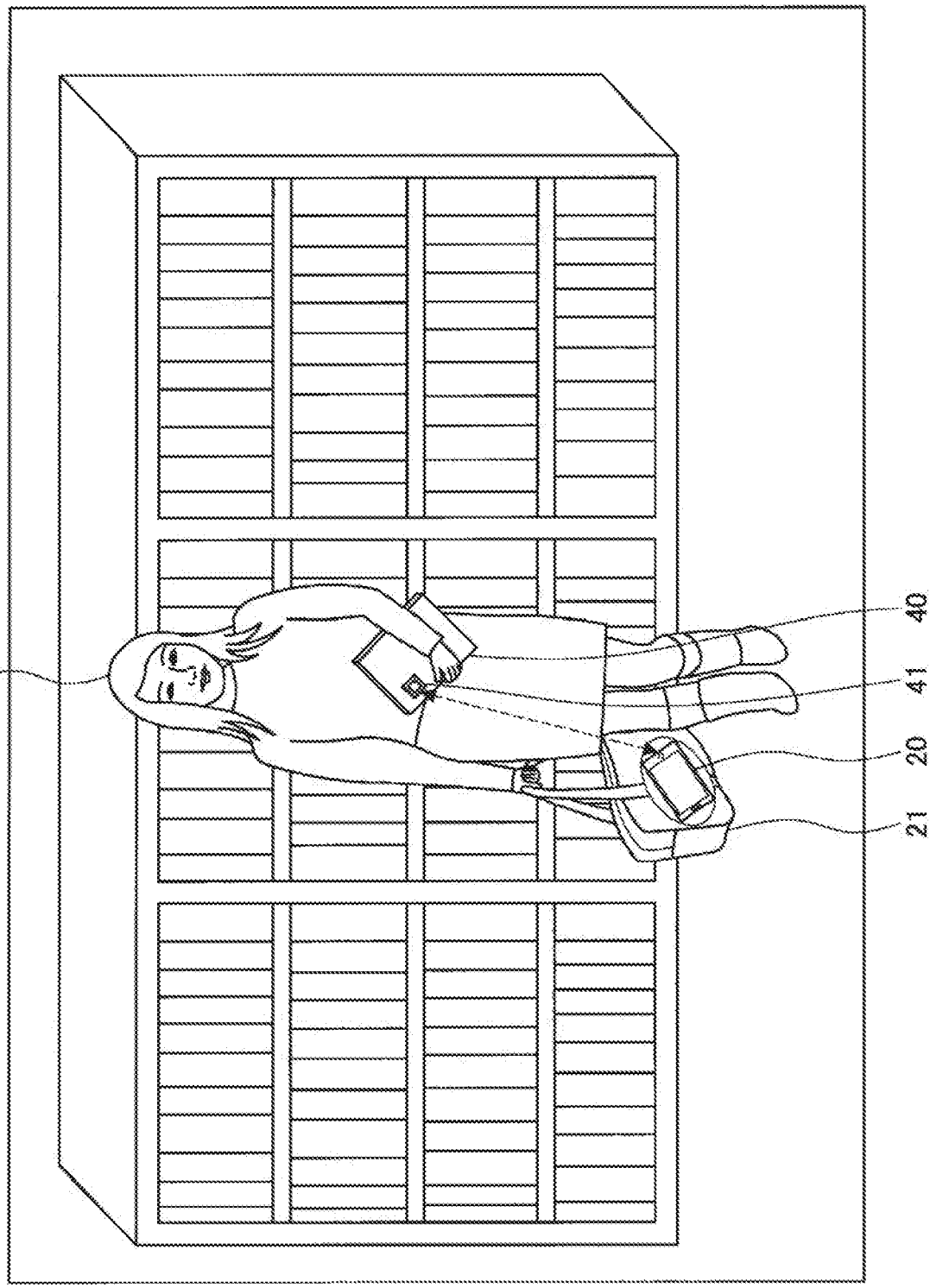
FIG. 19 is a diagram illustrating a configuration related to a second authentication process of a communication terminal according to the third operation example.

Next, configuration and operation related to the second authentication process for authenticating the book 40 performed by the communication terminal 20 will be described. FIG. 19 is a diagram illustrating a configuration related to the second authentication process of the communication terminal 20 according to the third operation example. As illustrated in FIG. 19, in the second authentication process, it is assumed that the communication terminal 20 is in a bag 21 and a person P2 is holding the book 40 to which the item tag 41 is attached. Note that, FIG. 19 illustrates the communication terminal 20 in the bag 21. However, it may also be assumed that the communication terminal 20 is in a pocket of clothing or the like.

In the case where the communication terminal 20 is in the bag 21 and the person P2 moves with the book 40 in her hand, a distance between the communication terminal 20 and the item tag 41 attached to the book 40 varies depending on a storage position of the communication terminal 20. However, in the case where the book 40 moves along with the communication terminal 20, the distance between the communication terminal 20 and the book 40 is roughly constant. Therefore, in the case where the communication terminal 20 determines, from values of RSSIs of radio waves in communication with the item tag 41, that values of variation of the communication distance between the item tag 41 and the communication terminal 20 are continuously within a predetermined range for a predetermined time period, the communication terminal 20 may authenticate the book 40 to which the item tag 41 is attached. Alternatively, in the case where the communication terminal 20 determines that the values of variation of the communication distance between the item tag 41 and the communication terminal 20 are out of the predetermined range, the communication terminal 20 may cancel the authentication of the book 40 to which the item tag 41 is attached.

(Operation)

Figure 20:
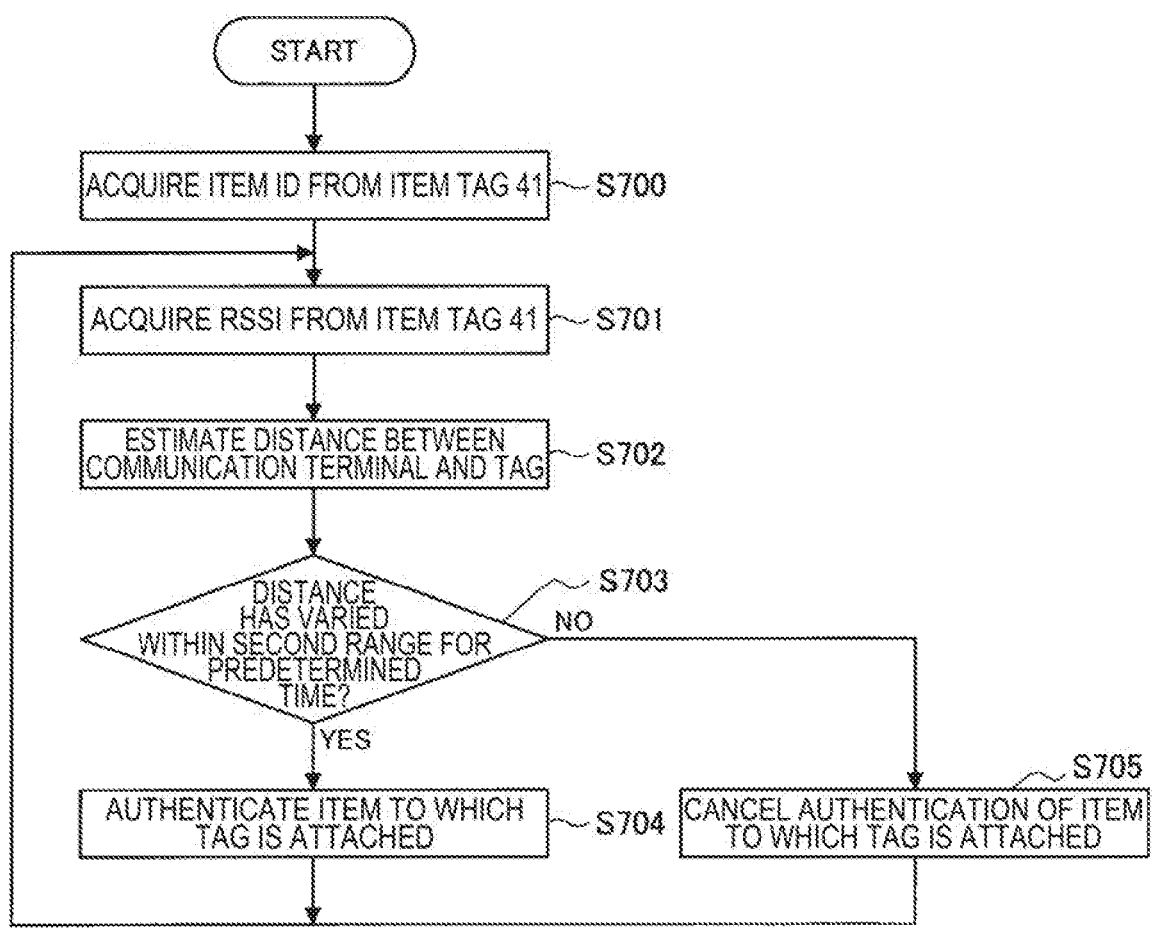
FIG. 20 is a flowchart illustrating operation based on the configuration related to the second authentication process of the communication terminal according to the third operation example.

FIG. 20 is a flowchart illustrating operation based on a configuration related to the second authentication process of the communication terminal 20 according to the third operation example. First, the communication terminal 20 acquires the item ID from the approaching item tag 41 (S700), and acquires an RSSI of a radio wave in the communication with the item tag 41 (S701). Note that, operation in Step S700 is the same as the operation in Step S502 in the sequence diagram in FIG. 16. Next, the communication terminal 20 estimates a distance from the item tag 41 on the basis of the acquired RSSI (S702).

Next, for example, in the case where the values of variation of the communication distance estimated by the communication terminal 20 are continuously within a second range (YES in S703), the communication terminal 20 authenticates the book 40 to which the item tag 41 is attached (S704). On the other hand, in the case where a value of the variation of the communication distance exceeds the second range (NO in S703), the communication terminal 20 cancels authentication of the book 40 if the book 40 to which the item tag 41 is attached has already been authenticated (S705).

The communication terminal 20 repeats the above described operation, and appropriately authenticates the book 40 and appropriately cancels the authentication of the book 40. According to the above described configuration, it is possible to authenticate the book 40 on the basis of temporal change in the distance between the communication terminal 20 and the item tag 41 even if the positional relation between the communication terminal 20 and the book 40 varies from person to person.

After the operation in Step S704 or Step S705 finishes, the communication terminal 20 returns to Step S701 and acquires an RSSI from the item tag 41 again. This operation may be repeatedly performed until the book 40 to which the item tag 41 is attached is subjected to the payment process or communication between the communication terminal 20 and the item tag 41 is disconnected.

(3.3.3. Supplement)

Note that, when the communication terminal 20 authenticates the book 40, the communication terminal 20 may show the user that the book 40 is authenticated, for example. Specifically, the communication terminal 20 may show the user that the book 40 is authenticated by displaying it on a screen or outputting it by voice. This allows the user to recognize that the book 40 is authenticated by the communication terminal 20.

In addition, in the case where a condition for the book 40 to be authenticated by the communication terminal 20 is satisfied, the communication terminal 20 may cause the user to decide whether to perform the authentication, for example. Specifically, the communication terminal 20 may determine whether to perform the authentication on the basis of user input via the input unit. Accordingly, it is possible to avoid authentication of the book 40 that the user does not want. In addition, the communication terminal 20 may cancel the authentication of the book 40 that has already been authenticated in response to the user input via the input unit. Accordingly, it is possible to cancel authentication of the book 40 that the user does not want.

In addition, the communication terminal 20 may perform an authentication process in which the first authentication process and the second authentication process are combined. Specifically, the communication terminal 20 may authenticate the book 40 in the case where the communication distance between the communication terminal 20 and the item tag 41 is within the first range and values of variation of the communication distance between the item tag 41 and the communication terminal 20 are continuously within the second range for a predetermined time period. This can improve accuracy of authentication performed by the communication terminal 20.

In addition, the above described authentication process may be performed by the information processing device 10. For example, the information processing device 10 acquires an RSSI of a radio wave in communication between the communication terminal 20 and the item tag 41. Subsequently, the information processing device 10 may link the book 40 with the communication terminal 20 and authenticate the book 40 in the case where the communication distances calculated from the RSSI and the values of variation of the communication distances satisfy the above described conditions. This enables the information processing device 10 to perform all the procedures of the authentication process.

<3.4. Fourth Operation Example>

The third operation example of the information processing system 1 has been described above. Next, the fourth operation example of the information processing system 1 will be described.

Figure 21:
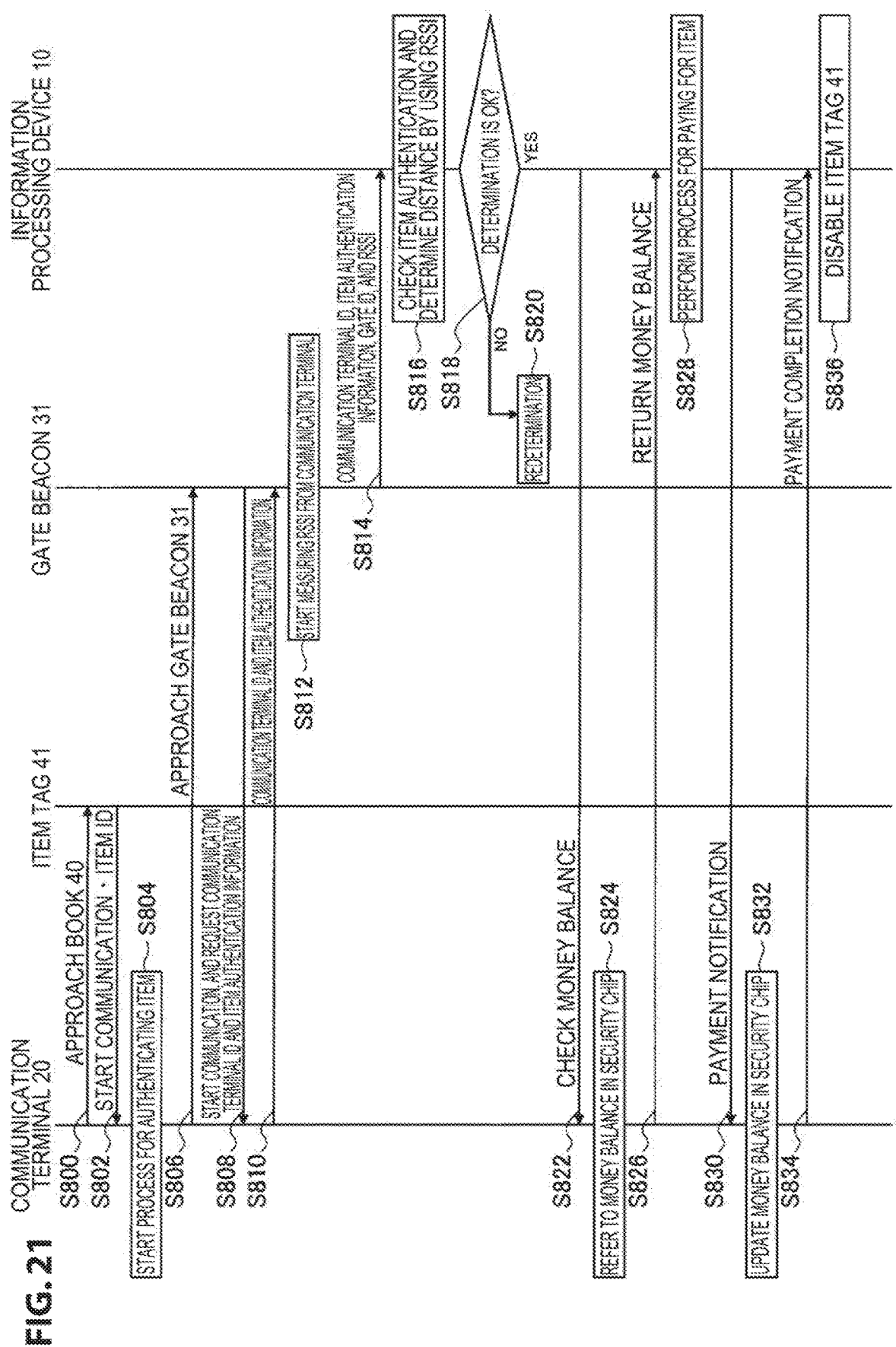
FIG. 21 is a sequence diagram illustrating a fourth operation example of an information processing system according to an embodiment of the present disclosure.

FIG. 21 is a sequence diagram illustrating the fourth operation example of the information processing system 1 according to the embodiment of the present disclosure. Here, a case will be described in which the communication terminal 20 performs a process for authenticating the book 40, and the gate beacon 31 transmits authentication information related to the book 40, the communication terminal ID of the communication terminal 20, and an RSSI measurement value of a radio wave in communication with the communication terminal 20, to the information processing device 10.

First, when the communication terminal 20 approaches the book 40 to which the item tag 41 is attached (S800), the communication terminal 20 starts communication with the item tag 41 and acquires the item ID from the item tag 41

(S802). Next, after the acquisition of the item ID, the communication terminal 20 starts the process for authenticating the book 40 associated with the item ID, on the basis of an RSSI in communication with the item tag 41 attached to the book 40 (S804).

Next, it is assumed that a user with the communication terminal 20 approaches the gate beacon 31 with the book 40 that has been authenticated by the communication terminal 20 in his/her hand. When the communication terminal 20 approaches the gate beacon 31 (S806), the communication terminal 20 starts communication with the gate beacon 31, and the gate beacon 31 requests the communication terminal ID and the authentication information related to the book 40 from the communication terminal 20 (S808). Next, the gate beacon 31 acquires the communication terminal ID and the authentication information related to the book 40 from the communication terminal 20 (S810). In addition to the start of communication with the communication terminal 20, the gate beacon 31 also starts measuring an RSSI of a radio wave in communication with the communication terminal 20 (S812).

Subsequently, the gate beacon 31 transmits the communication terminal ID of the communication terminal 20, the gate ID of the gate 30 including the gate beacon 31, the authentication information related to the book 40, and the measured RSSIs to the information processing device 10 (S814).

After the acquisition of the pieces of information, the information processing device 10 performs check and determination as described below (S816). First, the information processing device 10 checks the authentication information related to the book 40 of the communication terminal 20. In addition, the information processing device 10 determines a communication distance between the communication terminal 20 and the gate beacon 31 by using the RSSI extracted by the extraction unit 120.

In the case where a result of the check and e result of the determination do not satisfy a predetermined condition (NO in S818), the information processing device 10 returns to Step S814 to reacquire and redetermine an RSSI and authentication information related to the book 40 from the gate beacon 31 (S820).

In the case where the result of the determination satisfies the predetermined condition (YES in S818), the information processing device 10 starts a process for paying for the book 40 to which the item tag 41 is attached. Next, the process in Step S822 to Step S836 is the same as the process in Step S320 to Step S334 in the first operation example, and the repeated description will be omitted.

According to the above described configuration and operation, a user with the communication terminal 20 can pay for the book 40 simply by going through the gate 30 with the book 40 to which the item tag 41 is attached in his/her hand. In this case, the authentication process, the measurement process, and the determination process are dispersed to the information processing device 10, the communication terminal 20, and the gate beacon 31. Accordingly, for example, it is possible for more users to get a service from the information processing system 1.

4. Modification of Information Processing System According to Embodiment

The operation examples of the information processing system 1 including the information processing device 10 have been described above. Next, details of a modification of the information processing system 1 including the information processing device 10 will be described. In addition to the structural elements of the information processing system 1 described above, the information processing system 1 according to the modification further includes an authentication beacon 32. Next, with reference to FIG. 22 and FIG. 23, a configuration and an operation example of the information processing system 1 according to the modification will be described.

<4.1. Configuration of Information Processing System>

Figure 22:
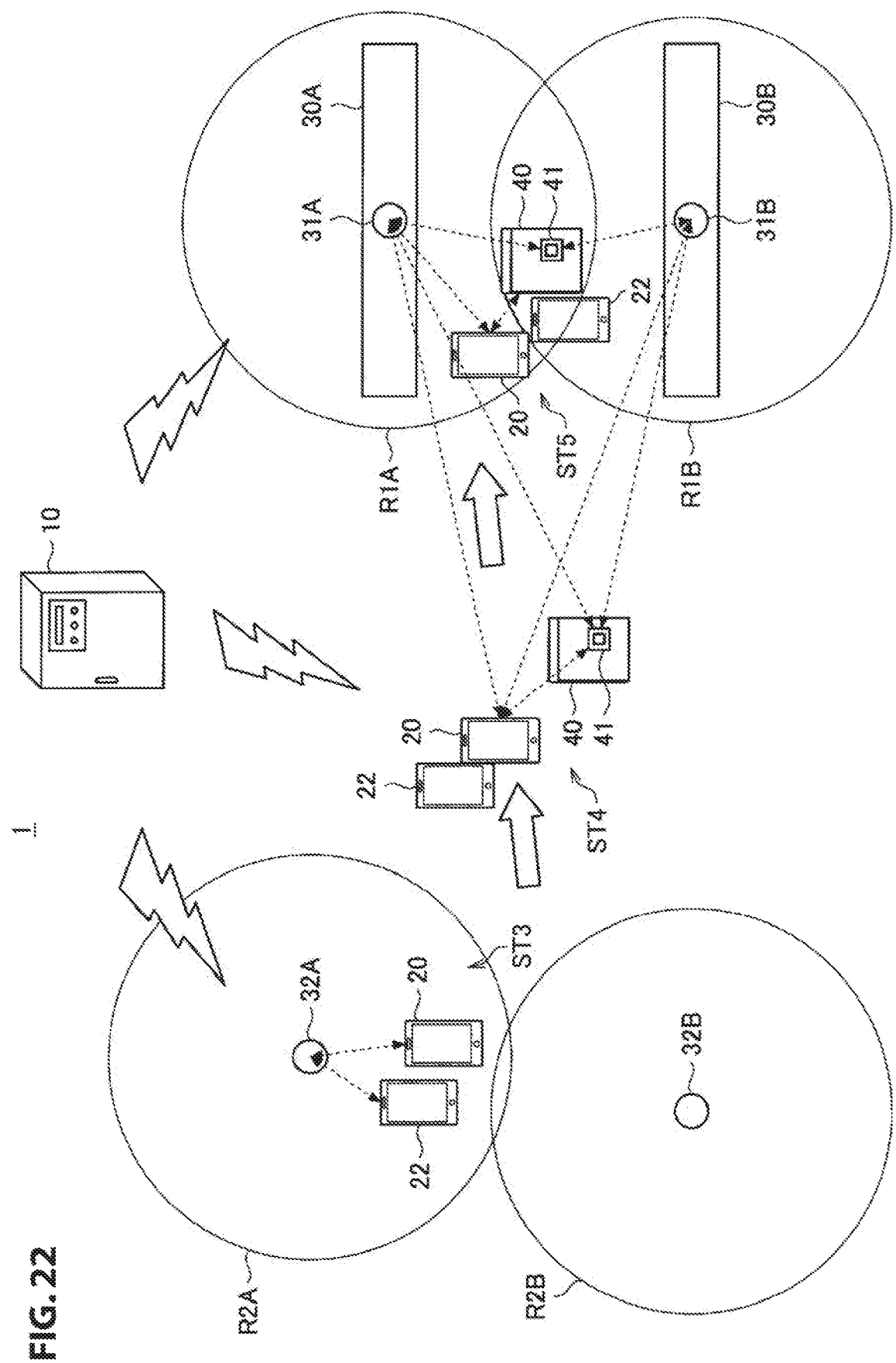
FIG. 22 is a diagram illustrating a configuration of an information processing system according to a modification of an embodiment of the present disclosure.

FIG. 22 is a diagram illustrating the modified configuration of the information processing system 1 according to the embodiment of the present disclosure. As illustrated in FIG. 22, the information processing system 1 includes the information processing device 10, the communication terminal 20, the gates 30A and 30B, and authentication beacons 32A and 32B. In addition, the gate 30A includes the gate beacon 31A, and the gate 30B includes the gate beacon 31B. Note that, description of the functions of the structural elements other than the authentication beacons 32A and 32B will be omitted.

—Authentication Beacon

The authentication beacon 32 is placed in any position in a store using the information processing system 1 or near an entrance of the store. The authentication beacon 32 communicates with the information processing device 10 and the communication terminal 20, and performs various kinds of information processing. For example, the authentication beacon 32 may authenticate the communication terminal 20 that is used for payment, and may transmit information on the authenticated communication terminal 20 to the information processing device 10.

Specifically, first, in the case where the communication terminal 20 approaches the authentication beacon 32, the authentication beacon 32 starts communication with the communication terminal 20 and checks whether the communication terminal 20 is a terminal that is used for the payment. In the case where the communication terminal 20 is to be used for the payment, the authentication beacon 32 requests the information processing device 10 to authenticate the communication terminal 20. Subsequently, the information processing device 10 performs a process for authenticating the communication terminal 20 as a terminal used for payment. Specifically, the information processing device 10 stores the communication terminal ID of the communication terminal 20 in association with a flag indicating the terminal used for payment. When the authentication process finishes, the information processing device 10 notifies the communication terminal 20 that the communication terminal 20 is the terminal that can be used for payment.

According to this structural element, it is possible for a user to select which communication terminal to use for the payment in the case where the user has a plurality of communication terminals 20 and 22, for example, as illustrated in FIG. 22.

Specifically, as illustrated in FIG. 22, the communication terminals 20 and 22 first check whether they are the terminal that is used for payment by using the authentication beacon 32A, in the case where the user is in a position ST3 included in a communication range R2A of the authentication beacon 32A. In this example, it is assumed that to the authentication beacon 32A, the communication terminal 20 answers that only the communication terminal 20 is the terminal that is used for payment through user input. Subsequently, in the case where the user gets the book 40 at a position TS4 and moves to a position ST5, only the communication terminal 20 that is authenticated as the terminal that is used for payment communicates with the gate beacon 31A and the like, and performs the payment process. On the other hand, the communication terminal 22 that is not authenticated as the terminal that is used for payment does not communicate with the gate beacons 31 or the like.

Since the information processing system 1 includes the authentication beacons 32, it is possible to select a terminal by which the payment process is performed in the case where the user has a plurality of communication terminals, for example. Accordingly, it is possible to prevent a terminal that should not perform the payment process from erroneously performing the payment process, and it is possible to secure convenience for users.

Note that, in the case where the communication terminal 20 that is used for payment is identified by the authentication beacon 32, the information processing device 10 may transmit other information to the communication terminal 20 when notifying that the communication terminal 20 that is used for the payment is authenticated, for example. Specifically, the information processing device 10 may transmit a coupon or leaflet regarding discount on products to the communication terminal 20 in addition to the notification of authentication. In addition, when communicating with the communication terminal 20, the authentication beacon 32 may transmit the coupon or the like to the communication terminal 20 instead of the authentication process. In addition, the information processing device 10 may transmit, to the communication terminal 20, the information for recommending an item displayed in the store or information indicating a position of the displayed item, on the basis of information on items that the user has bought in the past by using the communication terminal 20. This can improve convenience for the user.

In addition, a way of installing the authentication beacons 32 in a store is not specifically limited. For example, the authentication beacons 32 may be installed in the gates, or the authentication beacons 32 as it is may be attached to a wall, a ceiling, a floor, a side of a book shelf, or the like in a store.

<4.2. Operation Example of Information Processing System>

The configuration of the information processing system 1 according to the modification has been described above. Next, the operation example of the information processing system 1 according to the modification will be described.

Figure 23:
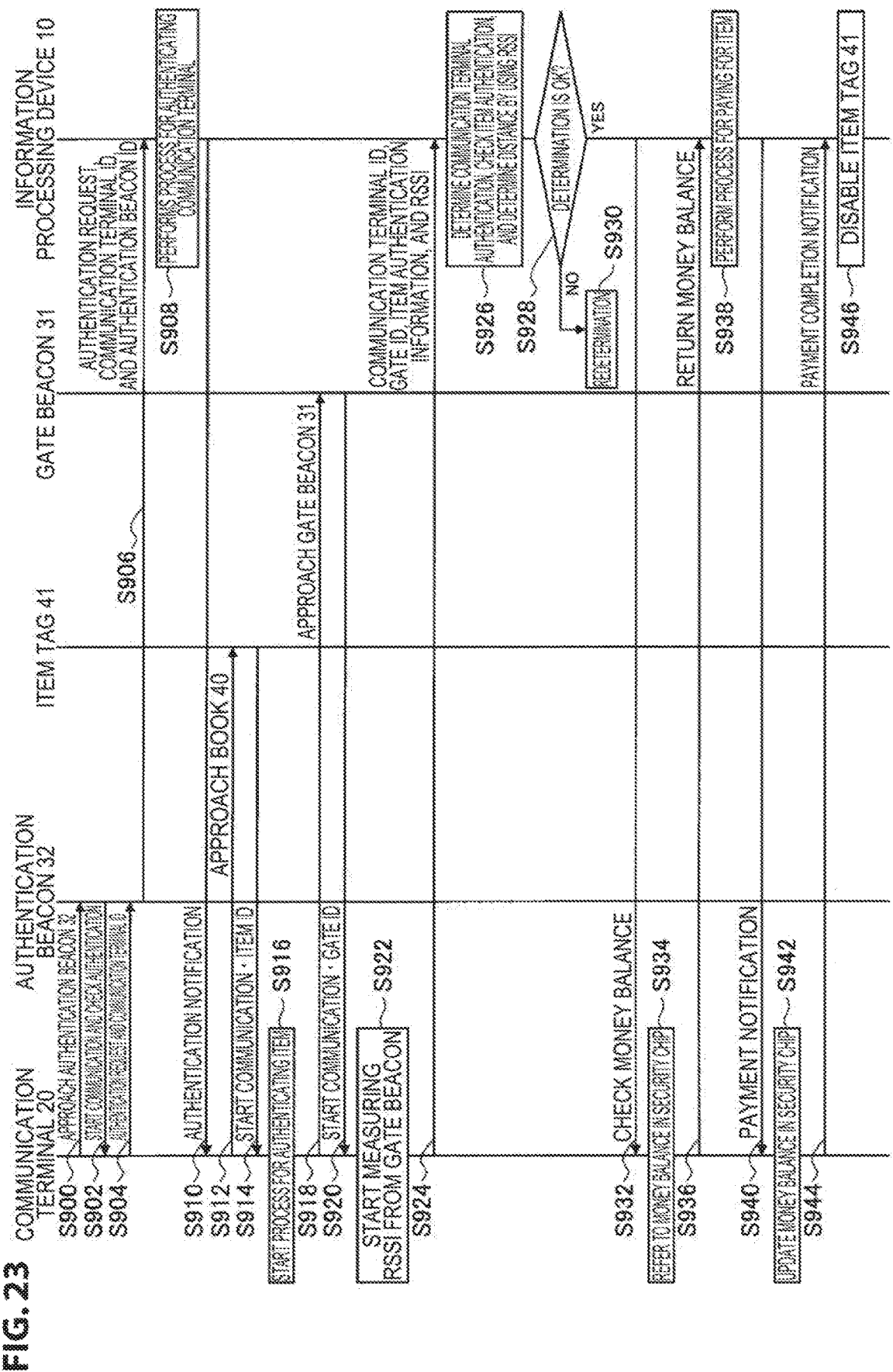
FIG. 23 is a sequence diagram illustrating an operation example based on a configuration of an information processing system according to a modification of an embodiment of the present disclosure.

FIG. 23 is a sequence diagram illustrating the operation example of the information processing system 1 according to the modification of the embodiment of the present disclosure. Here, a case will be described in which the communication terminal 20 is first authenticated as the information processing device 10 the terminal that is used for payment via the authentication beacon 32, and then the communication terminal 20 transmits the gate ID of the gate beacon 31, item authentication information, and an RSSI measurement value of a radio wave in communication with the gate beacon 31 to the information processing device 10.

First, when the communication terminal 20 approaches the authentication beacon 32 (S900), the authentication beacon 32 starts communication with the communication terminal 20 and checks whether the communication terminal 20 is a terminal that is used for the payment (S902). In the case where the communication terminal 20 is the terminal that is used for the payment, the communication terminal 20 transmits an authentication request that requests the authentication beacon 32 to authenticate the communication terminal 20 as the terminal that is used for payment (S904). In this case, the communication terminal 20 transmits its communication terminal ID to the authentication beacon 32.

The authentication beacon 32 transmits the communication terminal ID and the authentication request acquired from the communication terminal 20 to the information processing device 10 (S906). In this case, the authentication beacon 32 may transmit an authentication beacon ID for identifying the authentication beacon 32 to the information processing device 10. Note that, in Step S904 and Step S906, the communication terminal 20 may directly transmit the authentication request and the communication terminal ID to the information processing device 10. Subsequently, the information processing device 10 performs a process for authenticating the communication terminal 20 as the terminal that is used for payment (S908), and notifies the communication terminal 20 that the communication terminal 20 is the terminal that can be used for payment (S910). At this time, the information processing device 10 may transmit various kinds of information to the communication terminal 20 in addition to the notification.

Next, when the communication terminal 20 approaches the book 40 to which the item tag 41 is attached (S912), the communication terminal 20 starts communication with the item tag 41 and acquires the item ID from the item tag 41 (S914). Next, after the acquisition of the item ID, the communication terminal 20 starts the process for authenticating the book 40 associated with the item ID (S916).

Next, it is assumed that a user with the communication terminal 20 approaches the gate beacon 31 with the authenticated book 40 in his/her hand. When the communication terminal 20 approaches the gate beacon 31 (S918), the communication terminal 20 starts communication with the gate beacon 31 and acquires the gate ID from the gate beacon 31 (S920). In addition to the start of communication with the gate beacon 31, the communication terminal 20 also starts measuring an RSSI of a radio wave in communication with the gate beacon 31 (S922).

Next, the communication terminal 20 transmits the communication terminal ID of the communication terminal 20, the gate ID, the authentication information of the book 40, and the measured RSSIs to the information processing device 10 (S924).

After the acquisition of the pieces of information, the information processing device 10 performs check and determination as described below (S926). First, the information processing device 10 determines whether the communication terminal 20 is the terminal that has been authenticated as the terminal that is used for payment, on the basis of the communication terminal ID transmitted from the communication terminal 20. In addition, the information processing device 10 checks the authentication information related to the book 40 of the communication terminal 20. In addition, the information processing device 10 determines a communication distance between the communication terminal 20 and the gate beacon 31 by using the RSSI extracted by the extraction unit 120.

In the case where a result of the check and e result of the determination do not satisfy a predetermined condition (NO in S928), the information processing device 10 returns to Step S924 to reacquire and redetermine an RSSI and authentication information related to the book 40 from the communication terminal 20 (S930). Note that, in addition to the condition described in the first embodiment, the predetermined condition may include a condition that the communication terminal 20 is not authenticated by the information processing device 10 as the terminal that is used for payment, for example.

In the case where the result of the determination satisfies the predetermined condition (YES in S928), the information processing device 10 starts a process for paying for the book 40 to which the item tag 41 is attached. Next, the process in Step S932 to Step S946 is the same as the process in Step S320 to Step S334 in the first operation example according to the embodiment, and the repeated description will be omitted.

According to the above described configuration and operation, a user with the communication terminal 20 can pay for the book 40 simply by going through the gate 30 with the book 40 to which the item tag 41 is attached in his/her hand. In this case, for example, it is possible to make a payment after surely selecting a terminal that the user wants to use for the payment.

5. Hardware Configuration Diagram

The configurations and operation examples of the information processing device 10 and the information processing system 1 according to the embodiments of the present disclosure have been described above. The information processing in the information processing device 10 is achieved by operating cooperatively software and the information processing device 10. Hereinafter, for example, a hardware configuration of the information processing device 10 will be described.

Figure 24:
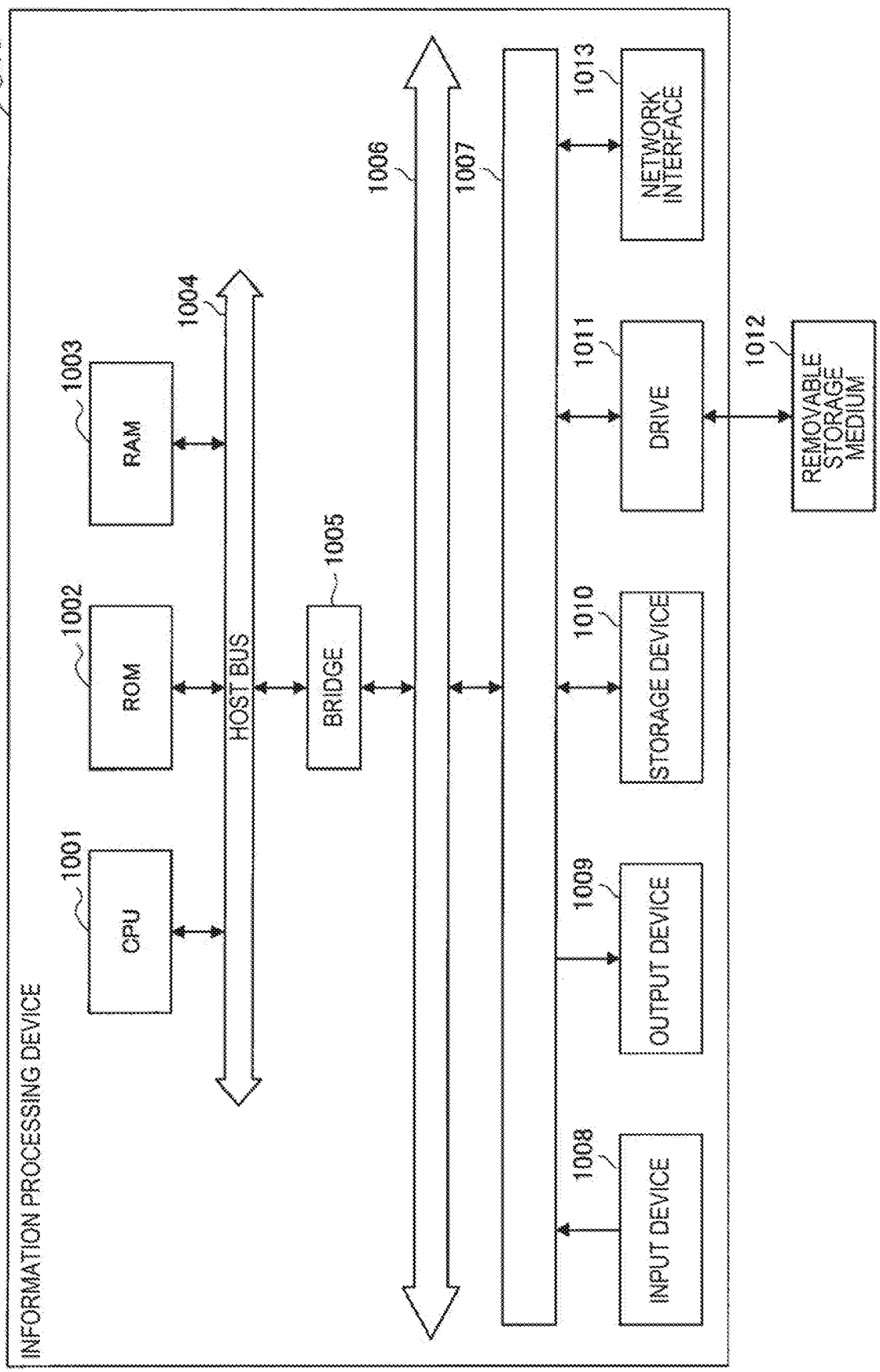
FIG. 24 is a block diagram illustrating a hardware configuration of an information processing device according to an embodiment of the present disclosure.

FIG. 24 is a block diagram illustrating the hardware configuration of the information processing device 10 according to an embodiment of the present disclosure. The information processing device 10 includes a central processing unit (CPU) 1001, read only memory (ROM) 1002, random access memory (RAM) 1003, and a host bus 1004. In addition, the information processing device 10 includes a bridge 1005, an external bus 1006, an interface 1007, an input device 1008, an output device 1009, a storage device 1010, a drive 1011, and a network interface 1013.

The CPU 1001 functions as an arithmetic device and a control device to control all of the operations in the information processing device 10 in accordance with various kinds of programs. The CPU 1001 may be a microprocessor. Note that, the CPU 1001 controls all of the operations in the information processing device 10 including the extraction unit 120 and the processing unit 130. The ROM 1002 stores programs, operation parameters, and the like used by the CPU 1001. The RAM 1003 transiently stores programs used when the CPU 1001 is executed, and parameters that change as appropriate when executing such programs. The CPU 1001, the ROM 1002, and the RAM 1003 are connected with each other via the host bus 1004 configured of a CPU bus or the like.

The host bus 1004 is connected with the external bus 1006 such as a Peripheral Component Interconnect/Interface (PCI) bus via the bridge 1005. Note that, the host bus 1004, the bridge 1005 and the external bus 1006 are not necessarily separated from one another, and their functions may be implemented by one bus.

The input device 1008 includes: an input mechanism used by the user for imputing information, such as a mouse, a keyboard, a touchscreen, a button, a microphone, a switch, or a lever; an input control circuit configured to generate an input signal on the basis of user input and to output the signal to the CPU 1001; and the like. By operating the input device 1008, the user of the information processing apparatus 10 can input various kinds of data into the information processing device 10 and instruct the information processing device 100 to perform a processing operation.

The output device 1009 may include a display device such as a CRT display device, a liquid crystal display (LCD) device, an OLED device, or a lamp, for example. Further, the output device 1009 includes audio output device such as a speaker or headphones. The output device 1009 outputs reproduced content, for example. Specifically, the display device displays various kinds of information such as reproduced video data by texts or images. On the other hand, the audio output device converts reproduced audio data, text data displayed on the display device, or the like into sound and outputs the sound.

The storage device 1010 is a device for data storage in the information processing device 10 according to the embodiment of the present disclosure. The storage unit 1010 may include a storage medium, a recording device which records data in a storage medium, a reader device which reads data from a storage medium, a deletion device which deletes data recorded in a storage medium, and the like. For example, the storage device is implemented as a hard disc drive (HDD) or a solid state drive (SSD). The storage device 1010 stores therein the programs executed by the CPU 1001 and various kinds of data. Note that, the storage device 1010 achieves the function of the storage unit 110.

The drive 1011 is a reader/writer for the storage medium, and is incorporated in or externally attached to the information processing device 10. The drive 1011 reads information recorded on a removable storage medium 1012 that is mounted such as a magnetic disk, an optical disc, a magneto-optical disk, or semiconductor memory, and outputs the information to the RAM 1003. The drive 1011 also writes information to the removable storage medium 1012.

The network interface 1013 is, for example, a communication interface including a communication device for connection to another device. Further, the network interface 1013 may be a communication device that supports a wireless local area network (LAN), a communication device that supports long term evolution (LTE), or a communication device that supports Bluetooth. Further, the network interface 1013 may be a wired communication device that performs communication in a wired manner. Note that, the network interface 1013 achieves the function of the communication unit 100.

6. Conclusion

With reference to FIGS. 1 to 24, the embodiment according to the present disclosure has been described. The information processing device 10 according to the embodiment of the present disclosure sorts the acquired RSSIs and extracts RSSIs included in the range from top 10% to top 30%. This can reduce temporal change in the extracted RSSIs. Accordingly, it is possible to certainly perform the process based on the RSSI. In addition, it is possible for the information processing device 10 to change the number of extracted RSSIs to be selected, a way of the selection, the number of extraction targets to be measured, or the like in accordance with a condition for the process (such as real-time performance or accuracy). Therefore, it is possible to use the RSSI corresponding to specification that an application target wants.

In addition, by using the above described functions achieved by the information processing device 10, the information processing system 1 according to the embodiment of the present disclosure can determine an accurate communication distance between the communication terminal 20 and the gate beacon 31, and an accurate communication distance between the communication terminal 20 and the item tag 41, for example. As described in the embodiment, this enables a user to pay for the book 40 simply by going through the gate 30 with the communication terminal 20 and the book 40.

In addition, it is possible for the information processing system 1 according to the embodiment of the present disclosure to authenticate a terminal to be used for payment by using the function achieved by the information processing device 10. This allows a user to select the terminal to be used for payment and realize safe payment.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

For example, in the above described embodiment, the processing unit 130 performs the process by using the RSSI output from the extraction unit 120. However, in the present technology, a timing of the process performed by the processing unit 130 is not specifically limited. For example, the processing unit 130 may perform the process by using a value of an RSSI acquired in the past. Therefore, for example, it is possible to estimate each communication distance history.

In addition, in the above described embodiment, the communication terminal 20 and the gate beacon 31 measure RSSIs of radio waves in communication. However, the present disclosure is not limited thereto. For example, in the case where the item tag 41 is an active tag, the item tag 41 may measure RSSIs of radio waves in communication with the communication terminal 20 and the gate beacon 31. In addition, the RSSIs measured by the item tag 41 may be transmitted to the information processing device 10 via the communication terminal 20 and the gate beacon 31, or may be directly transmitted to the information processing device 10.

In addition, according to the embodiment, the information processing device 10 determines two communication distances including the communication distance between the communication terminal 20 and the item tag 41 and the communication distance between the communication terminal 20 and the gate beacon 31. However, the present disclosure is not limited thereto. For example, the information processing device 10 may determine three or more communication distances between a plurality of communication devices. Specifically, in the case where the plurality of communication devices transmit radio waves to one device, it is possible for the information processing device 10 to estimate a position of the one device from communication distances between the one device and the plurality of communication devices.

In addition, according to the above described embodiments, the information processing device 10 refers to a money balance recorded on the security chip in the communication terminal 20. However, the present technology is not limited thereto. For example, the information processing device 10 may make a payment by using information on a bank account, a credit card, or the like of the user of the communication terminal 20 obtained from the communication terminal ID of the communication terminal 20.

Note that, the predetermined process performed by the processing unit 130 of the information processing device 10 is not limited to the above described communication distance determination process. For example, the predetermined process may be a process for selecting a base station to be used by the information processing device 10 for communicating with an external network. In other words, the information processing device 10 may perform a process for selecting a base station with a higher RSSI value on the basis of a measurement result output to the processing unit 130. This enables the information processing device 10 to select the base station that can efficiently establish communication.

In addition, the predetermined process may be a process for determining whether to stop communication with another communication device. In other words, the information processing device 10 may perform a process for determining whether to stop the communication with the another communication device on the basis of a measurement result output to the processing unit 130. This enables the information processing device 10 to determine that communication efficiency is deteriorated and stop exchange of large volume data with another communication device in the case where the RSSI is reduced during the exchange, for example. Accordingly, it is possible for the information processing device 10 and the communication device to avoid excessive electric power consumption at the time of reduction in the communication efficiency.

In addition, in the above described embodiment, the information processing device 10 is separated from the communication terminal 20 and the gate beacon 31. However, the present technology is not limited thereto. For example, the communication terminal 20 and the gate beacon 31 may include respective structural elements of the information processing device 10. Alternatively, the information processing device 10, the communication terminal 20, and the gate beacon 31 may be integrated with each other to provide an information processing system that achieves functions of the respective structural elements of the information processing device 10.

It may not be necessary to chronologically execute respective steps in the processing, which is executed by the information processing device 10 described in this specification, in the order described in the flow charts. For example, the respective steps in the processing which is executed by the information processing device 10 may be processed in the order different from the order described in the flow charts, and may also be processed in parallel.

In addition, it is also possible to create a computer program for causing hardware such as CPU, ROM, and RAM, which are embedded in an information processing device 10, to execute functions equivalent to the respective structural elements in the information processing device 10. Moreover, it may be possible to provide a storage medium having the computer program stored therein.

In addition, in the above described embodiments, the information processing system 1 is applied to a book store. However, the present technology is not limited thereto. For example, it is possible to apply the information processing system 1 according to the embodiment to a retail store including a shopping mall, a convenience store, and the like, a rental shop, or a library. In addition, the information processing system 1 according to the embodiment can be applied to transport industry for managing transportation of goods or stocks in warehouses.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)

An information processing device including:

an acquisition unit configured to acquire a measurement result of a radio wave;

an extraction unit configured to extract a measurement result indicating an intensity included in a range from top 10% to top 30% from a plurality of measurement results acquired by the acquisition unit; and a processing unit configured to perform a predetermined process by using the measurement result extracted by the extraction unit.

(2)

The information processing device according to (1), in which the extraction unit extracts a measurement result indicating an intensity included in a range from top 15% to top 25%.

(3)

The information processing device according to (1) or (2), in which the extraction unit extracts a measurement result indicating an intensity of a predetermined rank in the range.

(4)

The information processing device according to (1) or (2), further including a storage unit configured to sort intensities indicated by the plurality of measurement results acquired by the acquisition unit in numerical-value order and store the intensities rank by rank, in which the extraction unit decides a measurement result to be extracted on the basis of distribution of the plurality of intensities stored in the storage unit rank by rank.

(5)

The information processing device according to (4), in which the extraction unit decides a measurement result to be extracted by using a standard deviation of the distribution.

(6)

The information processing device according to any one of (1) to (5), in which the extraction unit extracts a measurement result indicating an intensity in the range from a plurality of measurement results in a period including a first time point, and the processing unit performs the predetermined process in association with the first time point by using the measurement result extracted by the extraction unit.

(7)

The information processing device according to any one of (1) to (6), in which the extraction unit extracts a plurality of measurement results from measurements results indicating intensities in the range.

(8)

The information processing device according to any one of (1) to (7), in which the radio wave is transmitted from a communication device, and the predetermined process includes a process for determining a communication distance between the communication device and a measurement position of the radio wave.

(9)

The information processing device according to (8), in which the communication device includes a first communication device and a second communication device that is associated with an item, and the processing unit determines a first communication distance between the first communication device and a measurement position of a radio wave transmitted from the first communication device, and a second communication distance between the second communication device and a measurement position of a radio wave transmitted from the second communication device, and performs a process related to the item in accordance with a result of the determination.

(10)

The information processing device according to (9), in which the processing unit determines whether an amount of variation in the second communication distance is continuously in a predetermined range.

(11)

An information processing method that is executed by an information processing device, the information processing method including:

a step of acquiring a measurement result of a radio wave;

a step of extracting a measurement result indicating an intensity included in a range from top 10% to top 30% from a plurality of acquired measurement results; and a step of performing a predetermined process by using the extracted measurement result.

(12)

A program causing a computer to function as:

an acquisition unit configured to acquire a measurement result of a radio wave;

an extraction unit configured to extract a measurement result indicating an intensity included in a range from top 10% to top 30% from a plurality of measurement results acquired by the acquisition unit; and a processing unit configured to perform a predetermined process by using the measurement result extracted by the extraction unit.

(13)

An information processing system including:

an acquisition unit configured to acquire a measurement result of a radio wave;

an extraction unit configured to extract a measurement result indicating an intensity included in a range from top 10% to top 30% from a plurality of measurement results acquired by the acquisition unit; and a processing unit configured to perform a predetermined process by using the measurement result extracted by the extraction unit.

REFERENCE SIGNS LIST

1 information processing system
10 information processing device
20 communication terminal
30 gate
31 gate beacon
32 authentication beacon
100 communication unit
110 storage unit
120 extraction unit
130 processing unit

The invention claimed is:

1. An information processing device, comprising:

an acquisition unit configured to:

acquire a first measurement result of a first radio wave, wherein the first radio wave is transmitted by a first communication device; and acquire a second measurement result of a second radio wave, wherein
the second radio wave is transmitted by a second communication device, and
the second communication device is associated with an item;
an extraction unit configured to extract a measurement result indicating an intensity included in a range from top 10% to top 30% of a plurality of measurement results acquired by the acquisition unit, wherein the plurality of measurement results includes the first measurement result; and
a processing unit configured to:
determine a first communication distance between the first communication device and a measurement position of the first radio wave based on the extracted measurement result;
determine a second communication distance between the second communication device and a measurement position of the second radio wave; and
execute a process related to the item based on the determined first communication distance and the determined second communication distance.

2. The information processing device according to claim 1,
wherein the extraction unit is further configured to extract the measurement result indicating the intensity included in a range from top 15% to top 25%.

3. The information processing device according to claim 1,
wherein the extraction unit is further configured to extract the measurement result indicating the intensity of a specific rank in the range.

4. The information processing device according to claim 1, further comprising a storage unit configured to:
sort a plurality of intensities indicated by the plurality of measurement results in a numerical-value order; and
store the plurality of intensities rank by rank, wherein the extraction unit is further configured to determine the extraction of the measurement result based on a distribution of the plurality of intensities stored in the storage unit.

5. The information processing device according to claim 4,
wherein the extraction unit is further configured to determine the extraction of the measurement result based on a standard deviation of the distribution.

6. The information processing device according to claim 1, wherein
the extraction unit is further configured to extract the measurement result in a period including a time point, and
the processing unit is further configured to determine the first communication distance based on the time point and the measurement result.

7. The information processing device according to claim 1,
wherein the extraction unit is further configured to extract a set of measurements results, of the plurality of measurement results, indicating a plurality of intensities in the range.

8. The information processing device according to claim 1,
wherein the processing unit is further configured to determine that an amount of variation in the second communication distance is continuous in a specific range.

9. An information processing method, comprising:
acquiring a first measurement result of a first radio wave, wherein the first radio wave is transmitted by a first communication device;
acquiring a second measurement result of a second radio wave, wherein
the second radio wave is transmitted by a second communication device, and
the second communication device is associated with an item;
extracting a measurement result indicating an intensity included in a range from top 10% to top 30% of a plurality of measurement results, wherein the plurality of measurement results includes the first measurement result;
determining a first communication distance between the first communication device and a measurement position of the first radio wave based on the extracted measurement result;
determining a second communication distance between the second communication device and a measurement position of the second radio wave; and
executing a process related to the item based on the determined first communication distance and the determined second communication distance.

10. A non-transitory computer-readable medium, having stored thereon computer-executable instructions, which when executed by a processor, cause the processor to execute operations, the operations comprising:
acquiring a first measurement result of a first radio wave, wherein the first radio wave is transmitted by a first communication device;
acquiring a second measurement result of a second radio wave, wherein
the second radio wave is transmitted by a second communication device, and
the second communication device is associated with an item;
extracting a measurement result indicating an intensity included in a range from top 10% to top 30% of a plurality of measurement results, wherein the plurality of measurement results includes the first measurement result;
determining a first communication distance between the first communication device and a measurement position of the first radio wave based on the extracted measurement result;
determining a second communication distance between the second communication device and a measurement position of the second radio wave; and
executing a process related to the item based on the determined first communication distance and the determined second communication distance.

11. An information processing system, comprising:
an acquisition unit configured to:
acquire a first measurement result of a first radio wave, wherein the first radio wave is transmitted by a first communication device; and
acquire a second measurement result of a second radio wave, wherein
the second radio wave is transmitted by a second communication device, and
the second communication device is associated with an item;
an extraction unit configured to:
extract a measurement result indicating an intensity included in a range from top 10% to top 30% of a plurality of measurement results, wherein the plurality of measurement results includes the first measurement result; and a processing unit configured to:
- determine a first communication distance between the first communication device and a measurement position of the first radio wave based on the extracted measurement result;
- determine a second communication distance between the second communication device and a measurement position of the second radio wave; and
- execute a process related to the item based on the determined first communication distance and the determined second communication distance.

* * * * *